US012634066B2

(12) United States Patent
Manolakos et al.

(10) Patent No.: US 12,634,066 B2
(45) Date of Patent: May 19, 2026

(54) REFERENCE SIGNAL PHASE TIME DRIFT MODEL REPORTING FOR REFERENCE SIGNAL TIME-DOMAIN COHERENCY IN NEW RADIO

(71) Applicant: QUALCOMM INCORPORATED, San Diego, CA (US)

(72) Inventors: Alexandros Manolakos, Escondido, CA (US); Wei Yang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 848 days.

(21) Appl. No.: 17/908,824

(22) PCT Filed: Mar. 18, 2021

(86) PCT No.: PCT/US2021/022995
§ 371 (c)(1),
(2) Date: Sep. 1, 2022

(87) PCT Pub. No.: WO2021/216236
PCT Pub. Date: Oct. 28, 2021

(65) Prior Publication Data
US 2024/0195553 A1 Jun. 13, 2024

(30) Foreign Application Priority Data

Apr. 23, 2020 (GR) .............................. 20200100206

(51) Int. Cl.
H04L 5/00 (2006.01)
(52) U.S. Cl.
CPC .......... H04L 5/0048 (2013.01); H04L 5/0005 (2013.01)

(58) Field of Classification Search
None
See application file for complete search history.

(56) References Cited

U.S. PATENT DOCUMENTS 6,261,232 B1 * 7/2001 Yokosawa ................ A61B 8/00
600/443
2011/0275382 A1 * 11/2011 Hakola ................. H04W 24/10
455/452.2

(Continued)

FOREIGN PATENT DOCUMENTS

CN      107888266 A     4/2018
EP       3606233 A1     2/2020
WO   WO-2018177262 A1   10/2018

OTHER PUBLICATIONS

International Search Report and Written Opinion—PCT/US2021/022995—ISA/EPO—Jun. 7, 2021.

(Continued)

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communications are described. A user equipment (UE) may report a time-domain model and parameters to indicate how one or more characteristics, such as a phase, of ports used to transmit reference signals can change across time. For example, the UE may determine one or more sets of transmission parameters associated with a reference signal type, where the one or more sets of transmission parameters can enable a receiving device to bundle reference signals of the reference signal type. The UE may transit an indication of these one or more sets of transmission parameters to the receiving device, where the indication can be associated with how a characteristic of the ports of the UE varies across time. Based on the indication of one or more sets of transmission param- (Continued)

eters, the receiving device may receive reference signals and bundle (e.g., combine) the reference signals.

33 Claims, 20 Drawing Sheets

(56) References Cited

U.S. PATENT DOCUMENTS

| 2011/0310831 | A1* | 12/2011 | Bhattad | H04B 7/0413 |
| | | | | 370/329 |
| 2015/0280876 | A1* | 10/2015 | You | H04L 27/2613 |
| | | | | 370/329 |
| 2015/0296385 | A1* | 10/2015 | Zhang | H04W 74/04 |
| | | | | 370/329 |
| 2016/0065341 | A1* | 3/2016 | Yoo | H04L 25/0224 |
| | | | | 370/336 |
| 2016/0142190 | A1* | 5/2016 | Lunttila | H04L 5/0094 |
| | | | | 370/329 |
| 2016/0234856 | A1 | 8/2016 | Xu et al. | |
| 2019/0104532 | A1* | 4/2019 | Park | H04L 5/0082 |
| 2019/0150029 | A1* | 5/2019 | Zhang | H04L 5/0092 |
| | | | | 375/260 |
| 2019/0313436 | A1* | 10/2019 | Lee | H04L 5/0094 |
| 2019/0334599 | A1* | 10/2019 | Davydov | H04L 5/0051 |
| 2020/0028657 | A1 | 1/2020 | Bharadwaj et al. | |
| 2020/0314854 | A1* | 10/2020 | Chen | H04W 72/53 |
| 2020/0336256 | A1* | 10/2020 | Chen | H04B 7/0665 |
| 2020/0389879 | A1* | 12/2020 | Zhang | H04L 5/0053 |
| 2021/0050964 | A1* | 2/2021 | Manolakos | H04L 5/0044 |
| 2021/0119744 | A1* | 4/2021 | Wang | H04L 5/0098 |
| 2022/0393827 | A1* | 12/2022 | Chen | H04L 5/0051 |

OTHER PUBLICATIONS

Interdigital Inc: "Discussions on Joint Channel Estimation for PUSCH", R1-2100733, 3GPP TSG RAN WG1 #104-e e-Meeting, Jan. 25-Feb. 5, 2021, 7 Pages.

Spreadtrum Communications: "Considerations on SRS Enhancement", R1-2009146, 3GPP TSG RAN WG1#103-e e-Meeting, Oct. 26-Nov. 13, 2020, 5 Pages.

VIVO: "Discussion on PUCCH Enhancements", R1-2100460, 3GPP TSG RAN WG1 #104-e e- Meeting, Jan. 25-Feb. 5, 2021, 6 Pages.

Qualcomm Incorporated: "Lower PAPR Reference Signals", 3GPP TSG RAN WG1 Meeting #95, 3GPP Draft; R1-1813445 Lower PAPR Reference Signals, 3rd Generation Partnership Project (3GPP), Mobile Competence Centre, 650, Route Des Lucioles, F-06921 Sophia-Antipolis Cedex, France, vol. RAN WG1, No. Spokane, WA, USA, 20181112-20181116, Nov. 3, 2018 (Nov. 3, 2018), pp. 1-24, XP051479767, Section 4, Section 3, tables 6-8.

Taiwan Search Report—TW110110204—TIPO Nov. 5, 2025.

* cited by examiner

Symbol
410

Reference Signal
Resource
405

400

401

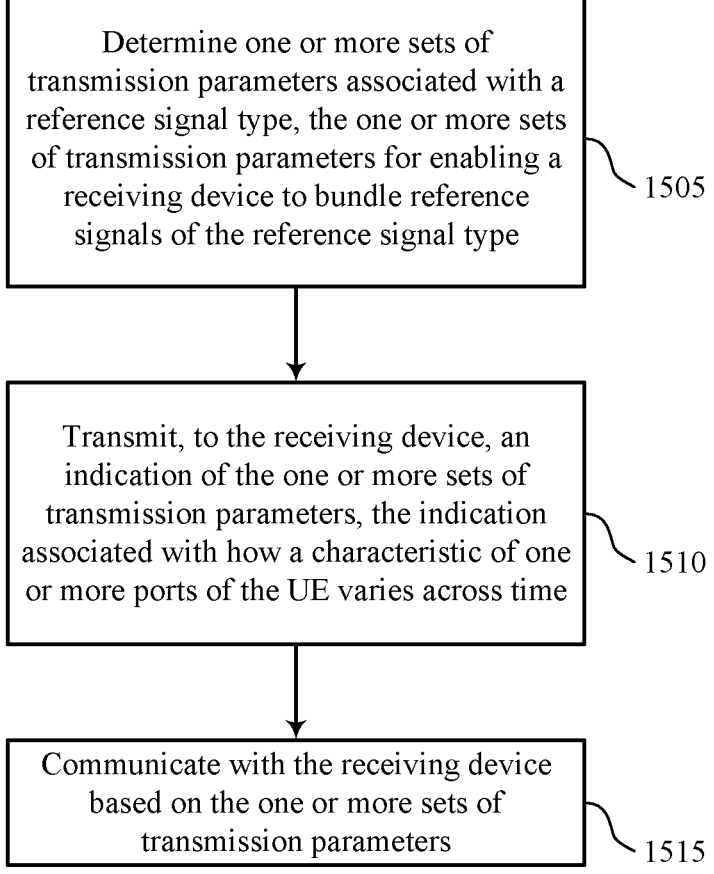

Determine one or more sets of transmission parameters associated with a reference signal type, the one or more sets of transmission parameters for enabling a receiving device to bundle reference signals of the reference signal type

1505

Transmit, to the receiving device, an indication of the one or more sets of transmission parameters, the indication associated with how a characteristic of one or more ports of the UE varies across time

1510

Communicate with the receiving device based on the one or more sets of transmission parameters

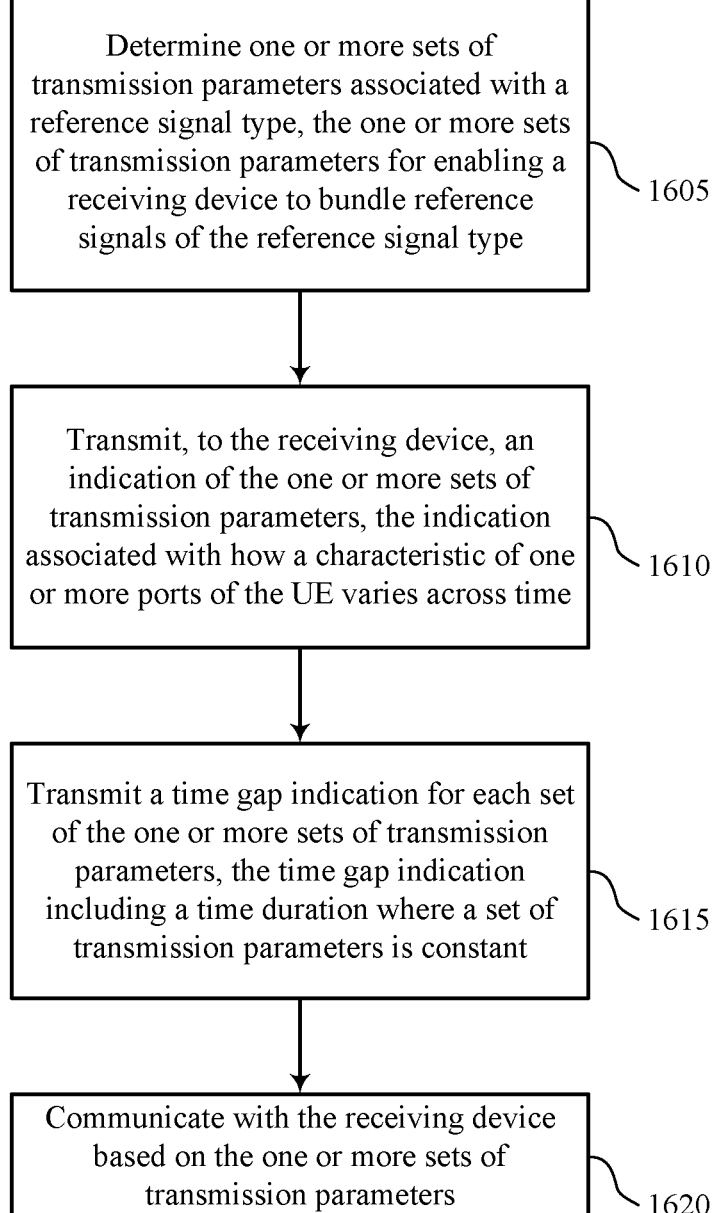

Determine one or more sets of transmission parameters associated with a reference signal type, the one or more sets of transmission parameters for enabling a receiving device to bundle reference signals of the reference signal type

1605

Transmit, to the receiving device, an indication of the one or more sets of transmission parameters, the indication associated with how a characteristic of one or more ports of the UE varies across time

1610

Transmit a time gap indication for each set of the one or more sets of transmission parameters, the time gap indication including a time duration where a set of transmission parameters is constant

1615

Communicate with the receiving device based on the one or more sets of transmission parameters

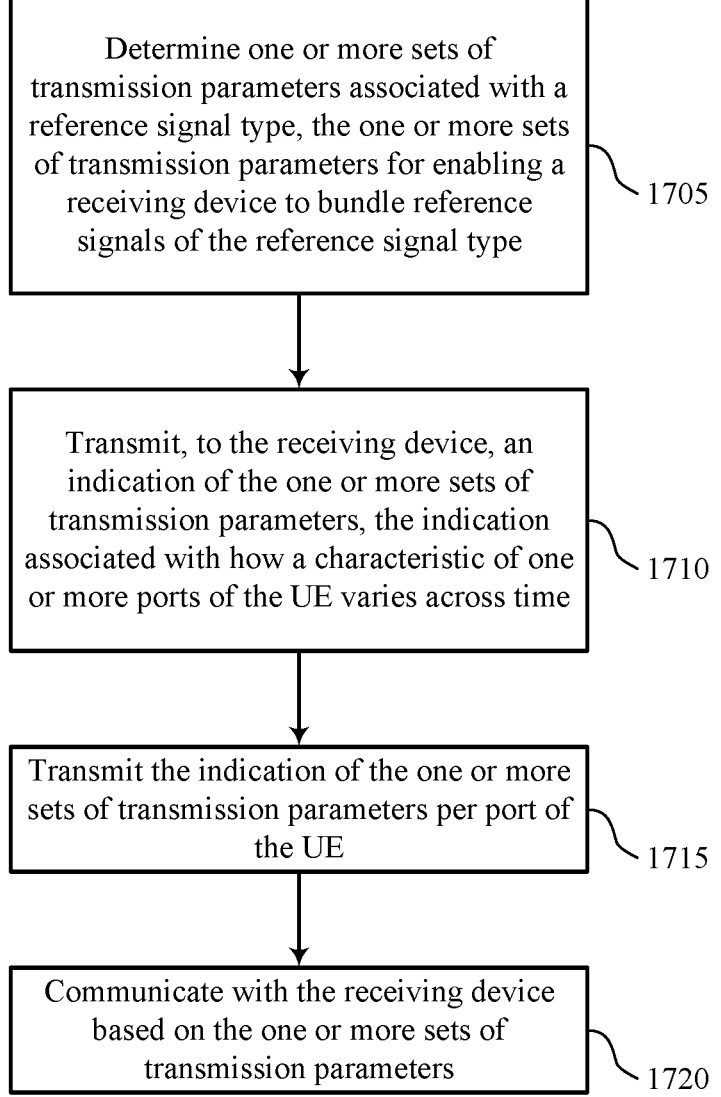

Determine one or more sets of transmission parameters associated with a reference signal type, the one or more sets of transmission parameters for enabling a receiving device to bundle reference signals of the reference signal type

1705

Transmit, to the receiving device, an indication of the one or more sets of transmission parameters, the indication associated with how a characteristic of one or more ports of the UE varies across time

1710

Transmit the indication of the one or more sets of transmission parameters per port of the UE

1715

Communicate with the receiving device based on the one or more sets of transmission parameters

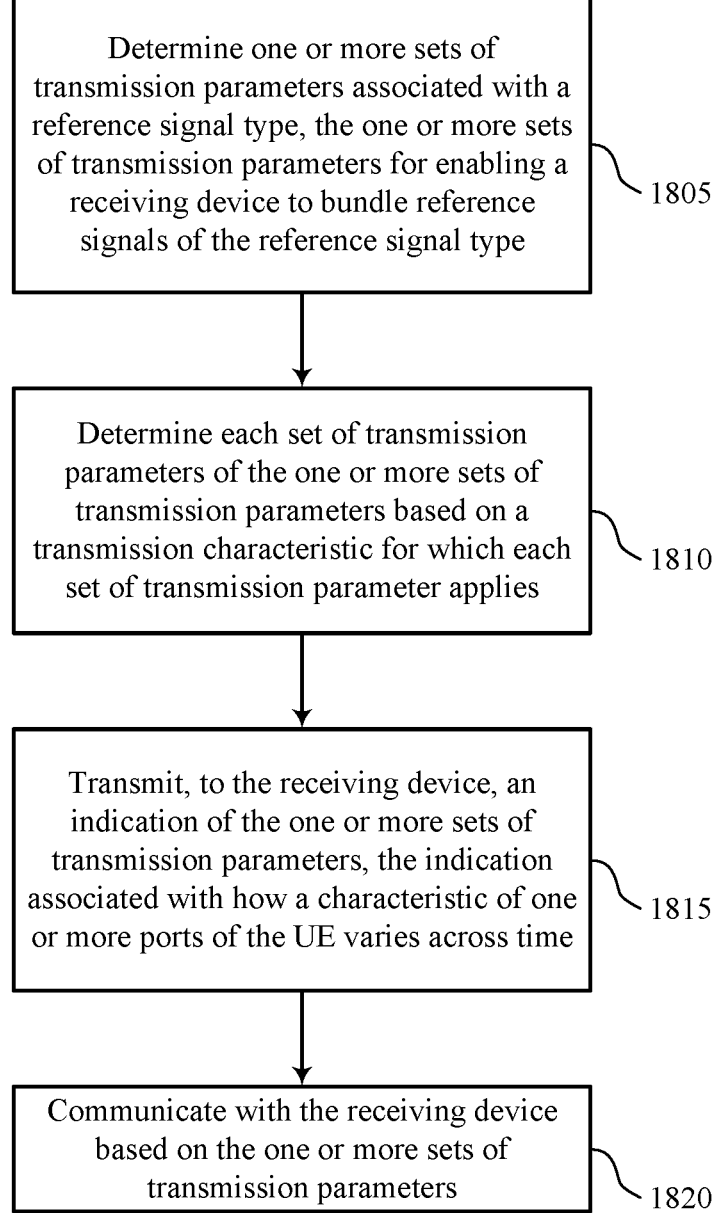

Determine one or more sets of transmission parameters associated with a reference signal type, the one or more sets of transmission parameters for enabling a receiving device to bundle reference signals of the reference signal type ⟍ 1805

Determine each set of transmission parameters of the one or more sets of transmission parameters based on a transmission characteristic for which each set of transmission parameter applies ⟍ 1810

Transmit, to the receiving device, an indication of the one or more sets of transmission parameters, the indication associated with how a characteristic of one or more ports of the UE varies across time ⟍ 1815

Communicate with the receiving device based on the one or more sets of transmission parameters ⟍ 1820

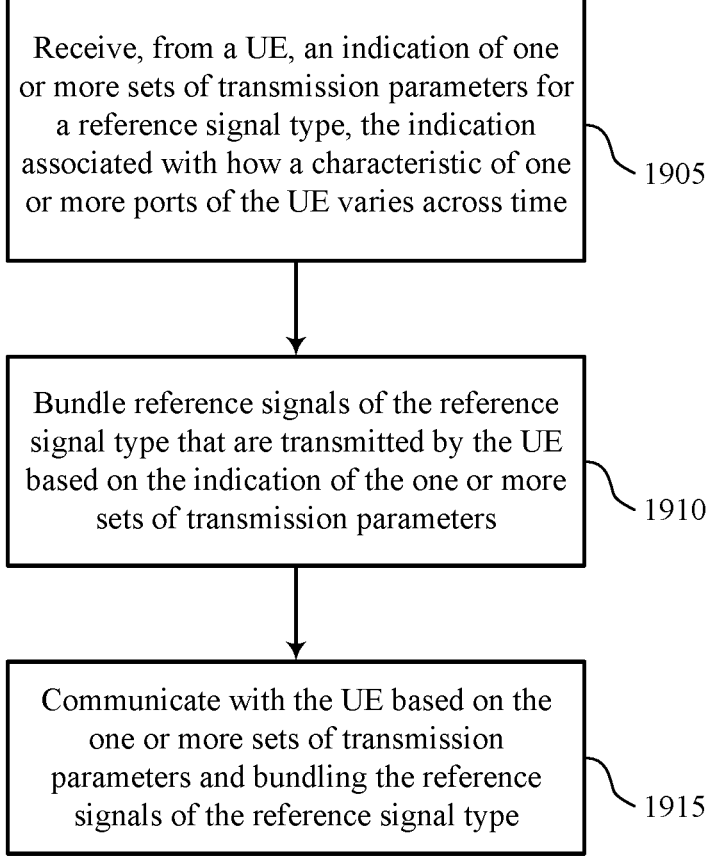

Receive, from a UE, an indication of one or more sets of transmission parameters for a reference signal type, the indication associated with how a characteristic of one or more ports of the UE varies across time

1905

Bundle reference signals of the reference signal type that are transmitted by the UE based on the indication of the one or more sets of transmission parameters

1910

Communicate with the UE based on the one or more sets of transmission parameters and bundling the reference signals of the reference signal type

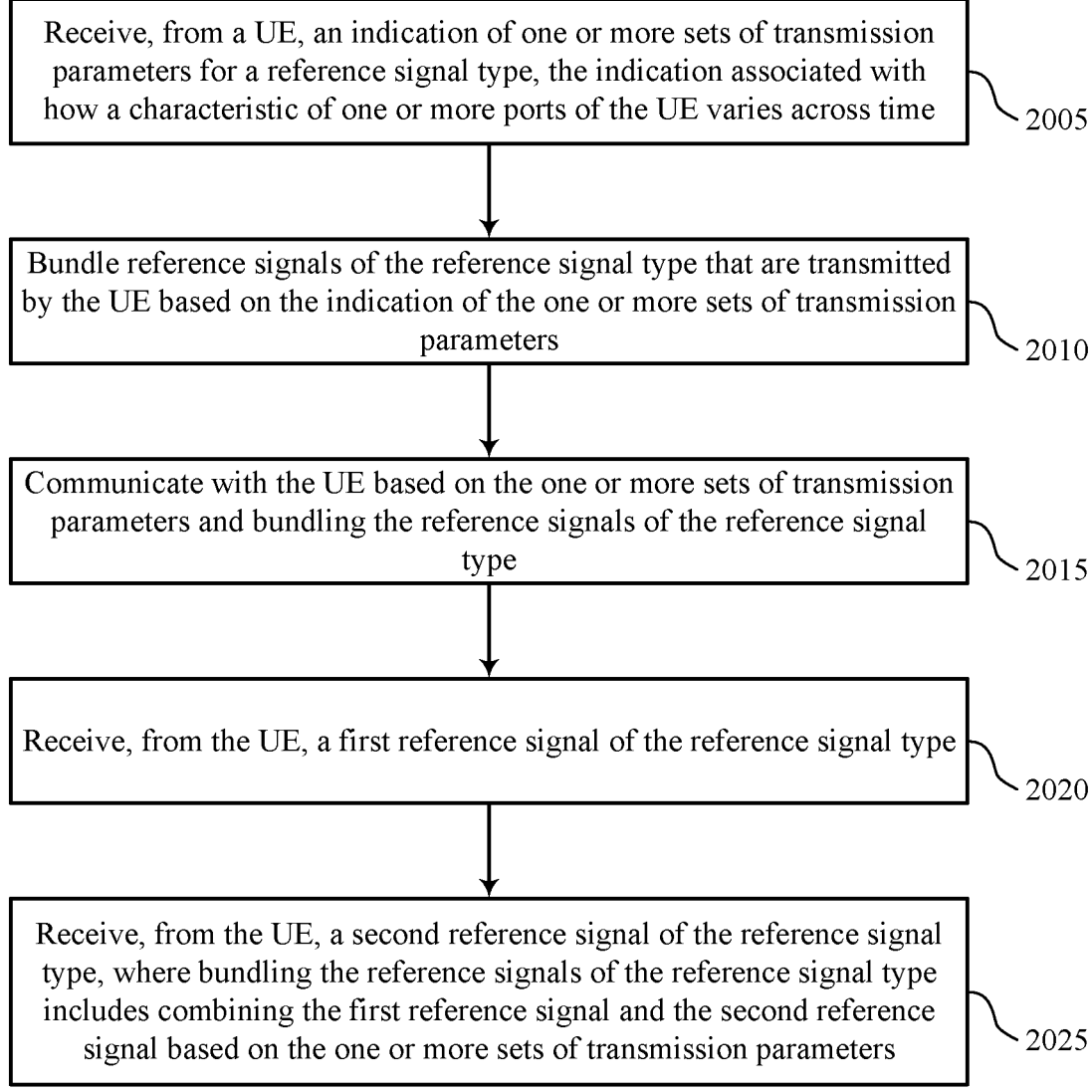

Receive, from a UE, an indication of one or more sets of transmission parameters for a reference signal type, the indication associated with how a characteristic of one or more ports of the UE varies across time — 2005

Bundle reference signals of the reference signal type that are transmitted by the UE based on the indication of the one or more sets of transmission parameters — 2010

Communicate with the UE based on the one or more sets of transmission parameters and bundling the reference signals of the reference signal type — 2015

Receive, from the UE, a first reference signal of the reference signal type — 2020

Receive, from the UE, a second reference signal of the reference signal type, where bundling the reference signals of the reference signal type includes combining the first reference signal and the second reference signal based on the one or more sets of transmission parameters — 2025

REFERENCE SIGNAL PHASE TIME DRIFT MODEL REPORTING FOR REFERENCE SIGNAL TIME-DOMAIN COHERENCY IN NEW RADIO

CROSS REFERENCE

The present Application is a 371 national stage filing of International PCT Application No. PCT/US2021/022995 by MANOLAKOS et al. entitled "REFERENCE SIGNAL PHASE TIME DRIFT MODEL REPORTING FOR REFERENCE SIGNAL TIME-DOMAIN COHERENCY IN NEW RADIO," filed Mar. 18, 2021; and claims priority to Greek Patent Application No. 20200100206 by MANOLAKOS et al. entitled "REFERENCE SIGNAL PHASE TIME DRIFT MODEL REPORTING FOR REFERENCE SIGNAL TIME-DOMAIN COHERENCY IN NEW RADIO," filed Apr. 23, 2020, each of which is assigned to the assignee hereof, and each of which is expressly incorporated by reference in its entirety herein.

FIELD OF TECHNOLOGY

The following relates generally to wireless communications and more specifically to reference signal phase time drift model reporting for reference signal time-domain coherency.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support reference signal phase time drift model reporting for reference signal time-domain coherency in New Radio (NR). Generally, the described techniques provide for a user equipment (UE) to report a time-domain model and parameters to indicate how one or more characteristics of ports used to transmit reference signals, such as a phase of the ports used to transmit the reference signals, can change across time. For example, the UE may determine one or more sets of transmission parameters associated with a reference signal type, where the one or more sets of transmission parameters can enable a receiving device to bundle reference signals of the reference signal type. Then, the UE may transmit an indication of these one or more sets of transmission parameters to the receiving device, where the indication can be associated with how the characteristic of one or more ports of the UE varies, for example, across time. In some examples, the characteristic associated with how the one or more ports of the UE varies across time may include a phase of the one or more ports that varies across time. Based on the indication of the one or more sets of transmission parameters, the receiving device may receive multiple reference signals (e.g., from the UE) and bundle (e.g., combine) the multiple reference signals. Accordingly, the UE and the receiving device may then communicate based on the indication of the one or more sets of transmission parameters and the bundled reference signals.

In some examples, the UE may report the one or more sets of transmission parameters using different transmission characteristics. For example, the UE may report the one or more sets of transmission parameters per one or more reference signal resources used to transmit the reference signals, per one or more reference signal resource set identifiers used to transmit the reference signals, per one or more number of ports used to transmit the reference signals, per one or more usage purposes for the reference signals, per one or more bands used for transmitting the reference signals, per one or more band combinations used for transmitting the reference signals, per one or more component carriers (CCs) used for transmitting the reference signals, per one or more bandwidth parts (BWPs) used for transmitting the reference signals, per one or more reference signal types, or any combination thereof, among other examples. Additionally, the one or more sets of transmission parameters may be valid between any two reference signals if one or more conditions (e.g., constraints) are met within a specified time window. For example, the one or more conditions may include a static number of ports used, remaining in a discontinuous reception (DRX) active time, no measurement gap occurring, using a same active BWP, dual connectivity and carrier aggregation configurations remaining the same, transmission power of the reference signals satisfying a threshold value, or any combination thereof, among other examples. Additionally, when transmitting the indication of the one or more sets of transmission parameters, the UE may transmit a time (e.g., a time gap) during which the receiving device can be configured to operate such that the one or more sets of transmission parameters remain constant and valid.

A method of wireless communications at a UE is described. The method may include determining one or more sets of transmission parameters associated with a reference signal type, the one or more sets of transmission parameters for enabling a receiving device to bundle reference signals of the reference signal type; transmitting, to the receiving device, an indication of the one or more sets of transmission parameters, the indication associated with how a characteristic of one or more ports of the UE varies across time; and communicating with the receiving device based on the one or more sets of transmission parameters.

An apparatus for wireless communications at a UE is described. The apparatus may include a processor, memory coupled with the processor, and instructions stored in the memory. The instructions may be executable by the processor to cause the apparatus to determine one or more sets of transmission parameters associated with a reference signal type, the one or more sets of transmission parameters for enabling a receiving device to bundle reference signals of the reference signal type; to transmit, to the receiving device, an indication of the one or more sets of transmission parameters, the indication associated with how a characteristic of one or more ports of the UE varies across time; and to communicate with the receiving device based on the one or more sets of transmission parameters.

Another apparatus for wireless communications at a UE is described. The apparatus may include means for determining one or more sets of transmission parameters associated with a reference signal type, the one or more sets of transmission parameters for enabling a receiving device to bundle reference signals of the reference signal type; means for transmitting, to the receiving device, an indication of the one or more sets of transmission parameters, the indication associated with how a characteristic of one or more ports of the UE varies across time; and means for communicating with the receiving device based on the one or more sets of transmission parameters.

A non-transitory computer-readable medium storing code for wireless communications at a UE is described. The code may include instructions executable by a processor to determine one or more sets of transmission parameters associated with a reference signal type, the one or more sets of transmission parameters for enabling a receiving device to bundle reference signals of the reference signal type; to transmit, to the receiving device, an indication of the one or more sets of transmission parameters, the indication associated with how a characteristic of one or more ports of the UE varies across time; and to communicate with the receiving device based on the one or more sets of transmission parameters.

In some examples of the method, apparatuses, and non-transitory computer-readable medium described herein, transmitting the indication of the one or more sets of transmission parameters may include operations, features, means, or instructions for transmitting a time gap indication for each set of the one or more sets of transmission parameters, the time gap indication including a time duration where a set of transmission parameters is constant.

In some examples of the method, apparatuses, and non-transitory computer-readable medium described herein, each set of the one or more sets of transmission parameters may be valid for a separate time gap.

In some examples of the method, apparatuses, and non-transitory computer-readable medium described herein, the time gap indication may include a time difference for which a time phase drift value is valid.

In some examples of the method, apparatuses, and non-transitory computer-readable medium described herein, transmitting the indication of the one or more sets of transmission parameters may include operations, features, means, or instructions for transmitting the indication of the one or more sets of transmission parameters per port of the UE.

In some examples of the method, apparatuses, and non-transitory computer-readable medium described herein, transmitting the indication of the one or more sets of transmission parameters may include operations, features, means, or instructions for transmitting a variance related to an uncertainty of the one or more sets of transmission parameters (e.g., the variance on the uncertainty may represent an error rate).

In some examples of the method, apparatuses, and non-transitory computer-readable medium described herein, determining the one or more sets of transmission parameters may include operations, features, means, or instructions for determining each set of transmission parameters of the one or more sets of transmission parameters based on a transmission characteristic for which each set of transmission parameter applies.

In some examples of the method, apparatuses, and non-transitory computer-readable medium described herein, the transmission characteristic may include a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a CC used for transmitting the reference signals, a BWP used for transmitting the reference signals, the reference signal type, or any combination thereof.

Some examples of the method, apparatuses, and non-transitory computer-readable medium described herein may further include operations, features, means, or instructions for transmitting a baseline set of transmission parameters, where each of the one or more sets of transmission parameters includes a differential set of values for a corresponding set of transmission parameters based on the baseline set of transmission parameters and where communicating with the receiving device is based on transmitting the baseline set of transmission parameters.

In some examples of the method, apparatuses, and non-transitory computer-readable medium described herein, transmitting the indication of the one or more sets of transmission parameters may include operations, features, means, or instructions for transmitting the indication of the one or more sets of transmission parameters via radio resource control (RRC) signaling, a UE capability message, a medium access control (MAC) control element (CE), or any combination thereof.

Some examples of the method, apparatuses, and non-transitory computer-readable medium described herein may further include operations, features, means, or instructions for transmitting the indication of the one or more sets of transmission parameters based on the one or more sets of transmission parameters being valid between transmission of two reference signals of the reference signal type, the one or more sets of transmission parameters being valid based on a number of ports used for transmitting the two reference signals not changing, a DRX active time remaining active for the UE, whether a measurement gap occurs between transmission of the two reference signals, maintaining an active BWP, maintaining a dual connectivity configuration, maintaining a carrier aggregation configuration, a transmission power of the two reference signals satisfying a power threshold value, or any combination thereof.

In some examples of the method, apparatuses, and non-transitory computer-readable medium described herein, a set of the one or more sets of transmission parameters may include a time phase drift rate, one or more time difference threshold values, an amplitude difference threshold value, a phase difference threshold value, or any combination thereof.

In some examples of the method, apparatuses, and non-transitory computer-readable medium described herein, a set of the one or more sets of transmission parameters may include a time-domain model for enabling the bundling of the reference signals at the receiving device.

In some examples of the method, apparatuses, and non-transitory computer-readable medium described herein, the reference signal type may include a sounding reference signal (SRS), a demodulation reference signal (DMRS), an uplink reference signal, a sidelink reference signal, or any combination thereof.

In some examples of the method, apparatuses, and non-transitory computer-readable medium described herein, the characteristic of how the one or more ports of the UE varies across time may include a phase of the one or more ports, an amplitude of the one or more ports, or both.

In some examples of the method, apparatuses, and non-transitory computer-readable medium described herein, the receiving device may include a base station, a second UE, an additional wireless device, or any combination thereof.

A method of wireless communications at a receiving device is described. The method may include receiving, from a UE, an indication of one or more sets of transmission parameters for a reference signal type, the indication associated with how a characteristic of one or more ports of the UE varies across time; bundling reference signals of the reference signal type that are transmitted by the UE based on the indication of the one or more sets of transmission parameters; and communicating with the UE based on the one or more sets of transmission parameters and bundling the reference signals of the reference signal type.

An apparatus for wireless communications at a receiving device is described. The apparatus may include a processor, memory coupled with the processor, and instructions stored in the memory. The instructions may be executable by the processor to cause the apparatus to receive, from a UE, an indication of one or more sets of transmission parameters for a reference signal type, the indication associated with how a characteristic of one or more ports of the UE varies across time; to bundle reference signals of the reference signal type that are transmitted by the UE based on the indication of the one or more sets of transmission parameters; and to communicate with the UE based on the one or more sets of transmission parameters and bundling the reference signals of the reference signal type.

Another apparatus for wireless communications at a receiving device is described. The apparatus may include means for receiving, from a UE, an indication of one or more sets of transmission parameters for a reference signal type, the indication associated with how a characteristic of one or more ports of the UE varies across time; means for bundling reference signals of the reference signal type that are transmitted by the UE based on the indication of the one or more sets of transmission parameters; and means for communicating with the UE based on the one or more sets of transmission parameters and bundling the reference signals of the reference signal type.

A non-transitory computer-readable medium storing code for wireless communications at a receiving device is described. The code may include instructions executable by a processor to receive, from a UE, an indication of one or more sets of transmission parameters for a reference signal type, the indication associated with how a characteristic of one or more ports of the UE varies across time; to bundle reference signals of the reference signal type that are transmitted by the UE based on the indication of the one or more sets of transmission parameters; and to communicate with the UE based on the one or more sets of transmission parameters and bundling the reference signals of the reference signal type.

Some examples of the method, apparatuses, and non-transitory computer-readable medium described herein may further include operations, features, means, or instructions for receiving, from the UE, a first reference signal of the reference signal type; and receiving, from the UE, a second reference signal of the reference signal type, where bundling the reference signals of the reference signal type includes combining the first reference signal and the second reference signal based on the one or more sets of transmission parameters.

In some examples of the method, apparatuses, and non-transitory computer-readable medium described herein, receiving the indication of the one or more sets of transmission parameters may include operations, features, means, or instructions for receiving a time gap indication for each set of the one or more sets of transmission parameters, the time gap indication including a time duration where a set of transmission parameters is constant.

Some examples of the method, apparatuses, and non-transitory computer-readable medium described herein may further include operations, features, means, or instructions for receiving, from the UE, a first reference signal of the reference signal type at a first time; receiving, from the UE, a second reference signal of the reference signal type at a second time; and determining that a difference between the second time and the first time is greater than the time duration indicated by the time gap indication, where the first reference signal and the second reference signal are not bundled based on the difference between the second time and the first time being greater than the time duration and the set of transmission parameters not being constant for the difference between the second time and the first time.

In some examples of the method, apparatuses, and non-transitory computer-readable medium described herein, each set of the one or more sets of transmission parameters may be valid for a separate time gap.

In some examples of the method, apparatuses, and non-transitory computer-readable medium described herein, the time gap indication may include a time difference for which a time phase drift value is valid.

In some examples of the method, apparatuses, and non-transitory computer-readable medium described herein, receiving the indication of the one or more sets of transmission parameters may include operations, features, means, or instructions for receiving the indication of the one or more sets of transmission parameters per port of the UE.

In some examples of the method, apparatuses, and non-transitory computer-readable medium described herein, receiving the indication of the one or more sets of transmission parameters may include operations, features, means, or instructions for receiving a variance related to an uncertainty of the one or more sets of transmission parameters (e.g., the variance on the uncertainty may represent an error rate).

Some examples of the method, apparatuses, and non-transitory computer-readable medium described herein may further include operations, features, means, or instructions for determining each set of transmission parameters of the one or more sets of transmission parameters is applicable for a separate transmission characteristic.

In some examples of the method, apparatuses, and non-transitory computer-readable medium described herein, the transmission characteristic may include a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a CC used for transmitting the reference signals, a BWP used for transmitting the reference signals, the reference signal type, or any combination thereof.

Some examples of the method, apparatuses, and non-transitory computer-readable medium described herein may further include operations, features, means, or instructions for receiving a baseline set of transmission parameters, where each of the one or more sets of transmission parameters includes a differential set of values for a corresponding set of transmission parameters based on the baseline set of transmission parameters and where communicating with the UE is based on receiving the baseline set of transmission parameters.

In some examples of the method, apparatuses, and non-transitory computer-readable medium described herein, receiving the indication of the one or more sets of transmission parameters may include operations, features, means, or instructions for receiving the indication of the one or more sets of transmission parameters via RRC signaling, a UE capability message, a MAC-CE, or any combination thereof.

Some examples of the method, apparatuses, and non-transitory computer-readable medium described herein may further include operations, features, means, or instructions for receiving the indication of the one or more sets of transmission parameters is based on the one or more sets of transmission parameters being valid between transmission of two reference signals of the reference signal type, the one or more sets of transmission parameters being valid based on a number of ports used for transmitting the two reference signals not changing, a DRX active time remaining active for the UE, whether a measurement gap occurs between transmission of the two reference signals, maintaining an active BWP, maintaining a dual connectivity configuration, maintaining a carrier aggregation configuration, a transmission power of the two reference signals satisfying a power threshold value, or any combination thereof.

In some examples of the method, apparatuses, and non-transitory computer-readable medium described herein, a set of the one or more sets of transmission parameters may include a time phase drift rate, one or more time difference threshold values, an amplitude difference threshold value, a phase difference threshold value, or any combination thereof.

In some examples of the method, apparatuses, and non-transitory computer-readable medium described herein, a set of the one or more sets of transmission parameters may include a time-domain model for enabling the bundling of the reference signals at the receiving device.

In some examples of the method, apparatuses, and non-transitory computer-readable medium described herein, the reference signal type may include an SRS, a DMRS, an uplink reference signal, a sidelink reference signal, or any combination thereof.

In some examples of the method, apparatuses, and non-transitory computer-readable medium described herein, the characteristic of how the one or more ports of the UE varies across time may include a phase of the one or more ports, an amplitude of the one or more ports, or both.

In some examples of the method, apparatuses, and non-transitory computer-readable medium described herein, the receiving device may include a base station, a second UE, an additional wireless device, or any combination thereof.

BRIEF DESCRIPTION OF THE DRAWINGS

FIGS. 3A, 3B, and 3C illustrate examples of phase drift reports that support reference signal phase time drift model reporting for reference signal time-domain coherency in NR in accordance with aspects of the present disclosure.

FIGS. 15 through 20 show flowcharts illustrating methods that support reference signal phase time drift model reporting for reference signal time-domain coherency in NR in accordance with aspects of the present disclosure.

DETAILED DESCRIPTION

Figure 1:
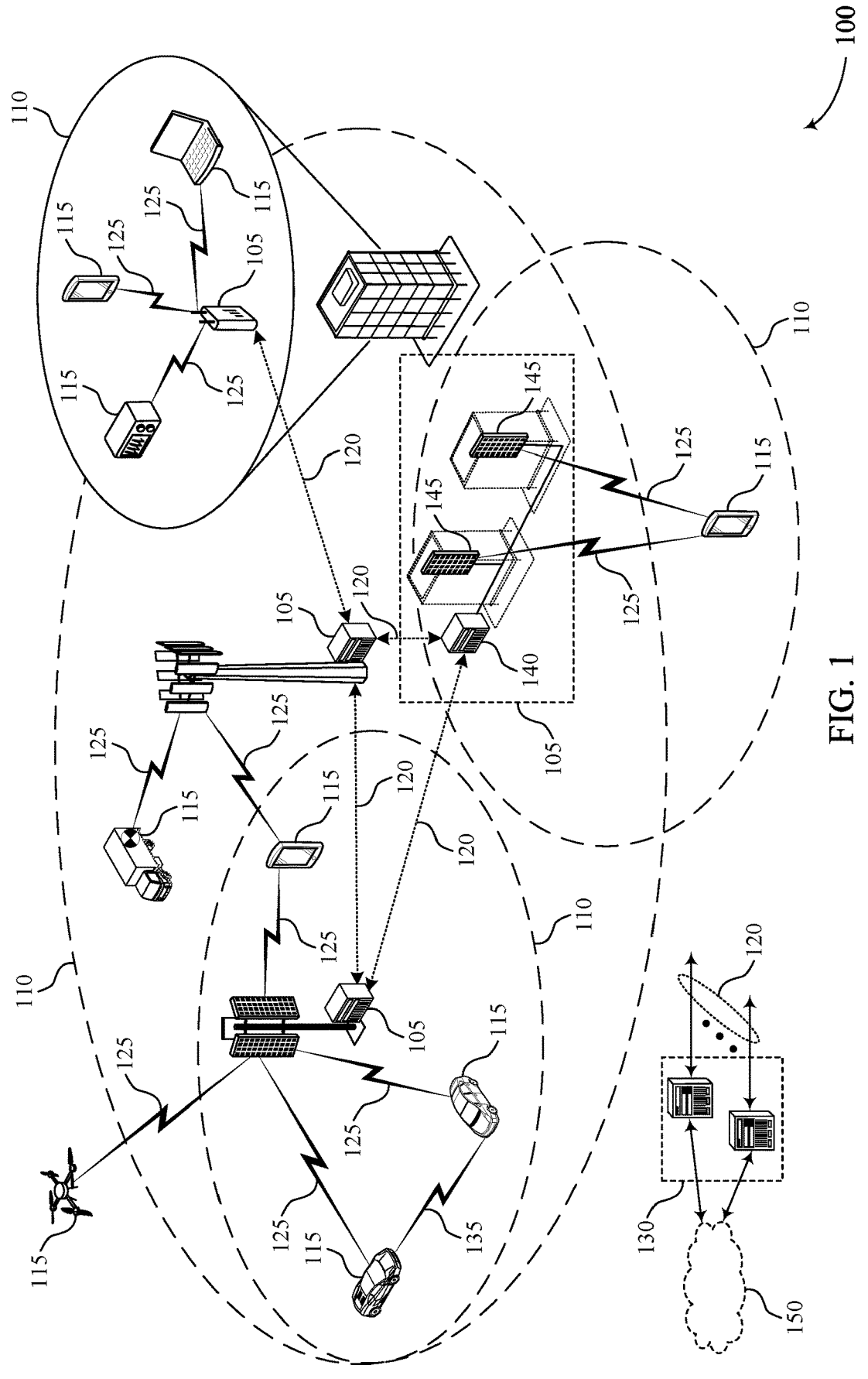
FIG. 1 illustrates an example of a system for wireless communications that supports reference signal phase time drift model reporting for reference signal time-domain coherency in New Radio (NR) in accordance with aspects of the present disclosure.

In some wireless communications systems (e.g., New Radio (NR) communications), a user equipment (UE) may transmit one or more reference signals to a receiving device (e.g., a base station, a second UE, etc.) as part of different procedures. For example, the different procedures may include a positioning determination, an antenna selection, a codebook selection, a beam selection, etc. To enhance capacity and coverage for the reference signal transmissions, the receiving device (which may also be referred to herein as a node) may be configured to bundle two or more reference signals together. In some examples, the UE may transmit a higher number of repetitions of the reference signals, and the receiving device and the UE may use a partial reference signal configuration across frequencies, etc.

In some examples, the UE may be configured to transmit reference signals and a subsequent transmission in a coherent manner to enable the receiving device to identify that the reference signals and subsequent transmission are related (e.g., for the receiving device to combine information in both types of messages). However, the coherent manner for transmitting the reference signals and subsequent transmission may include ensuring relative measurements between the reference signals and the subsequent transmission fall within allowable differences, which may not be supported for other use cases, such as the bundling of two or more reference signals together.

As described herein, a UE may report a parametrized model related to how a characteristic, such as phase, among other examples, may drift across time to indicate a rate that an absolute value of the characteristic (e.g., absolute phase) drifts for each port used to transmit a reference signal (e.g., UE reports a time-domain model/parameters on how the phase of reference signal ports may change across time). In some examples, different models may include different transmission parameters that may be dependent on a time gap between when two reference signals are transmitted. For example, a first set of transmission parameters may be used for bundling two reference signals based on a first time gap between reception of each of the two reference signals at the receiving node, and a second set of transmission parameters may be used for bundling two reference signals based on a second time gap that is different than the first time gap. In some examples, if a difference in time between receiving each reference signal of two reference signals is greater than a threshold value, the reference signals may not be bundled together.

In various examples, the model and transmission parameters may be considered valid between reception of two reference signals based on different conditions. For example, the different conditions may include if the UE is not signaled with a change in a number of ports used for transmitting the reference signals, the UE remains in a discontinuous reception (DRX) active time, no measurement gap occurs, an active bandwidth part (BWP) remains the same, dual connectivity and carrier aggregation configurations are not changed, a transmission power of the reference signals satisfies a power threshold value, or any combination thereof, among other examples. In some examples, the UE may report the different model parameters per reference signal resource or resource set identifier (ID), per number of ports used for the reference signal transmissions, per usage of the reference signals (e.g., positioning, antenna switching, codebook usage, etc.), per band, per band combination, per component carrier, per BWP, or any combination thereof, among other examples. The UE may report the model and parameters in a radio resource control (RRC) message, a UE capability message, a medium access control (MAC) control element (MAC-CE), etc. In various examples, these models and parameters may be used to bundle sounding reference signals (SRSs), demodulation reference signals (DMRSs), additional uplink reference signals, sidelink reference signals, etc.

Aspects of the disclosure are initially described in the context of wireless communications systems. Additionally, aspects of the disclosure are illustrated through an additional wireless communications system, phase drift reports, reference signal resource configurations, and a process flow. Aspects of the disclosure are further illustrated by and described with reference to apparatus diagrams, system diagrams, and flowcharts that relate to reference signal phase time drift model reporting for reference signal time-domain coherency in NR.

FIG. 1 illustrates an example of a wireless communications system 100 that supports reference signal phase time drift model reporting for reference signal time-domain coherency in NR in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

When transmitting reference signals to different wireless devices, a UE 115 may transmit reference signals on reference signal resources that span multiple adjacent symbols (e.g., one (1), two (2), four (4), etc. adjacent symbols up to 12 adjacent symbols anywhere in a slot) and may transmit the reference signals on one or more ports (e.g., up to four (4) ports) per reference signal resource. Additionally, the UE 115 may transmit the reference signals in reference signal resource sets that each contain one or more reference signal resources as described above. For example, the UE 115 may be configured (e.g., by a base station 105, a network device, etc.) with multiple reference signal resources, which may be grouped into a reference signal resource set depending on a use case for the reference signals (e.g., positioning, antenna switching, codebook-based, non-codebook based, beam management, etc.). In some examples, the UE 115 and a receiving device of the reference signals may use different mechanisms to enhance reference signal capacity and/or coverage for handling (e.g., transmitting, receiving, decoding, etc.) transmissions of reference signals. For example, the different mechanisms may include time bundling of the reference signals (e.g., bundling one or more reference signal resources across time), increased repetitions of reference signal transmissions, partial sounding across frequency, etc.

As part of the time bundling of the reference signals, the UE 115 may transmit reference signals in one or more reference signal resources across time (e.g., for a specific usage), where the UE 115 is expected to transmit the reference signals in such a way to enable a receiving device (e.g., a base station 105, a second UE 115, an additional wireless device, etc.) to coherently bundle the reference signals across time. For example, the UE 115 may transmit the reference signals in a way to enable the receiving device to align phases for the bundling of the reference signals. Accordingly, the receiving device may bundle reference signals that are transmitted within a time window by the UE 115 (e.g., across slots, multiple reference signal resources in a same slot, etc.), the UE 115 may transmit the reference signals to enable bundling for a configured time duration, or similar techniques may be used by the UE 115 and/or the receiving device to support the bundling.

In some examples, a UE 115 may be configured for a coherent uplink MIMO configuration. For example, as part of the coherent uplink MIMO configuration, the UE 115 may transmit one or more reference signals on multiple ports and then transmit a subsequent uplink message (e.g., a physical uplink shared channel (PUSCH), sidelink transmissions, etc.) at a later time, where the subsequent uplink message is transmitted in a coherent manner to the one or more reference signals. The coherent manner between transmitting the reference signal(s) and the subsequent uplink message may include when the UE 115 transmits the reference signal(s), a receiving device of the reference signal(s) (e.g., a base station 105) may transmit a precoder indication to the UE 115 in response prior to receiving the subsequent uplink message (e.g., a transmitted precoding matrix indicator (TPMI)), and the UE 115 may apply a precoder to the subsequent uplink transmission based on the precoder indication.

Additionally, as part of the coherent uplink MIMO configuration, Table 1 below may list allowable differences (e.g., maximum allowable differences) between measured relative power and phase errors between different physical antenna ports in any slot within a specified time window from a last transmitted reference signal on the same physical antenna ports. These allowable differences may be configured for the purpose of a subsequent uplink transmission (e.g., codebook or non-codebook usage), where corresponding measurements measured for the last transmitted reference signal are compared to measurements for the subsequent uplink transmission to indicate that the last transmitted reference signal and the subsequent uplink transmission are coherent. The allowable differences indicated in Table 1 may apply when an uplink transmission power at each physical antenna port is larger than zero (0) decibel milliwatts (dBm) for the reference signal transmission(s) and for a duration of a time window. The different difference measurements may be verified with a test metric of effective isotropic radiated power (EIRP) (e.g., a link may correspond to a beam peak direction, where an angle of the link is measured for the phase and power). Additionally, the allowable differences listed in Table 1 may include relative phase and power errors in a given slot compared to those measured at the last reference signal transmitted. The allowable differences listed in Table 1 may be example values for a given time window to enable coherency between two uplink signals (e.g., to allow the receiving device to determine the coherency based on the measurement differences being met).

TABLE 1

| Relative Measurements for Coherent Uplink MIMO | | |
|---|---|---|
| Difference of Relative Phase Error | Difference of Relative Power Error | Time Window |
| 40 degrees | 4 dB | 20 ms |

Based on the relative measurements, the receiving device may identify that reference signals transmitted by a UE 115 and a subsequent uplink message transmitted by the UE 115 are coherent (e.g., if the allowable differences are met between the reference signals and the subsequent uplink message) and may use information from the reference signals to process the subsequent uplink transmission. For example, the receiving device may combine information from the reference signals and the subsequent uplink message based on the coherency to fully decode the subsequent uplink message. However, the use of relative measurements for determining coherency may not be used for combining other types of signaling or identifying a consistency across the other types of signaling. For example, the time bundling of reference signals as described above may benefit from a configuration for transmitting multiple reference signals such that a receiving device of the multiple reference signals can identify that each of the reference signals are related to the other reference signals for the bundling, but relative measurements between each of the reference signals may not indicate this relation or enable the bundling.

Wireless communications systems may support efficient techniques for a UE 115 to report a time-domain model and parameters to indicate how a phase of ports (e.g., a characteristic of the ports) used to transmit reference signals can change across time (e.g., with absolute measurements of the phase). For example, the UE 115 may determine one or more sets of transmission parameters associated with a reference signal type, where the one or more sets of transmission parameters can enable a receiving device to bundle reference signals of the reference signal type. Subsequently, the UE may transmit an indication of these one or more sets of transmission parameters to the receiving device, where the indication is associated with how the phase of the ports (e.g., a characteristic) of the UE 115 varies across time. Based on the indication of the one or more sets of transmission parameters, the receiving device may receive multiple reference signals and bundle (e.g., combine) the multiple reference signals. Subsequently, the UE and the receiving device may then communicate based on the indication of the one or more sets of transmission parameters and the bundled reference signals.

Figure 2:
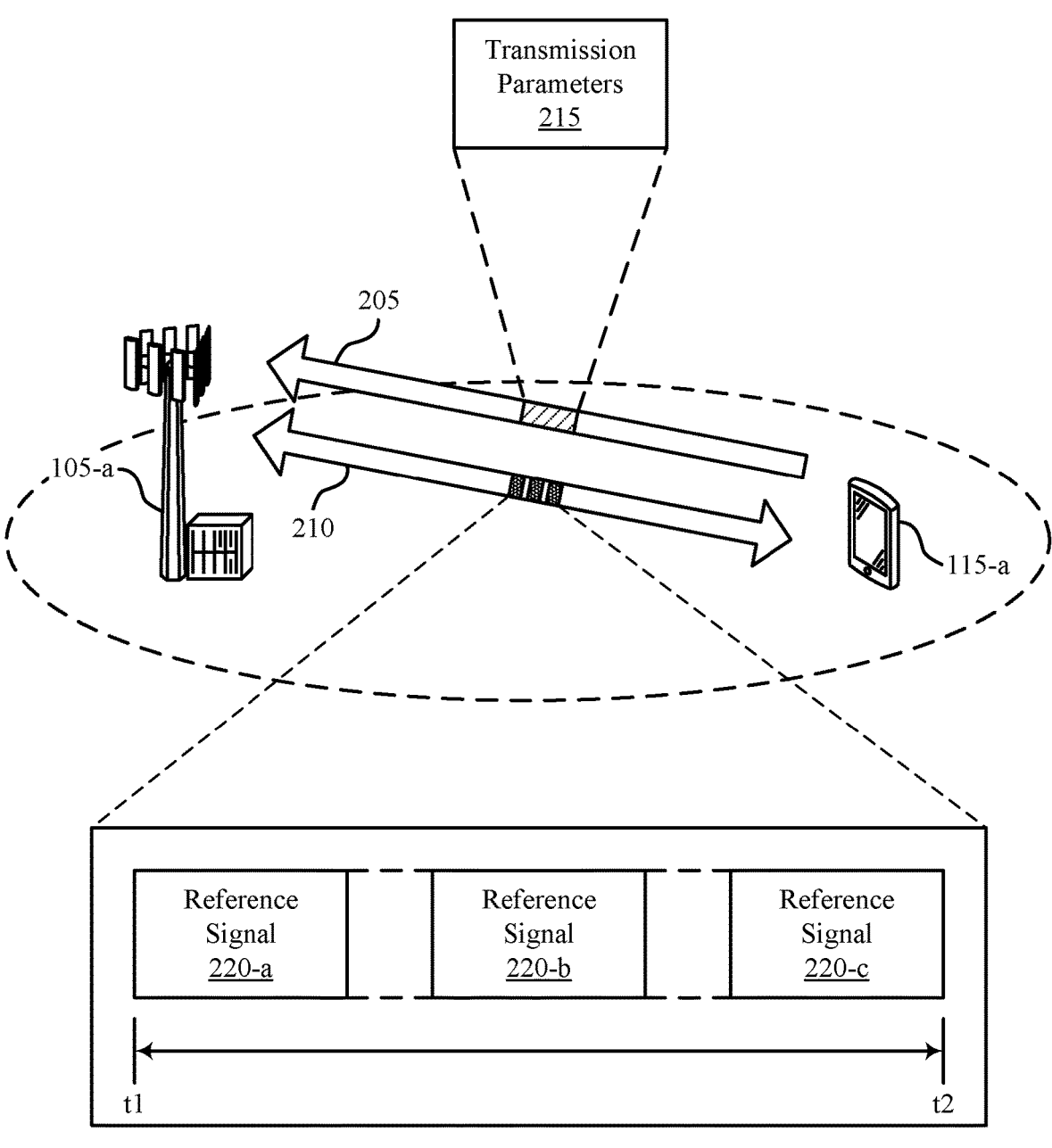
FIG. 2 illustrates an example of a wireless communications system that supports reference signal phase time drift model reporting for reference signal time-domain coherency in NR in accordance with aspects of the present disclosure.

FIG. 2 illustrates an example of a wireless communications system 200 that supports reference signal phase time drift model reporting for reference signal time-domain coherency in NR in accordance with aspects of the present disclosure. In some examples, wireless communications system 200 may implement aspects of or may be implemented by aspects of wireless communications system 100. For example, wireless communications system 200 may include a base station 105-*a* and a UE 115-*a*, which may be examples of corresponding base stations 105 and UEs 115, respectively, as described with reference to FIG. 1. Additionally, UE 115-*a* may transmit configuration information to base station 105-*a* on resources of a carrier 205, where the configuration information enables the UE 115-*a* and base station 105-*a* to further communicate on resources of a carrier 210. In some examples, carrier 205 and carrier 210 may be a same carrier, different carriers, or partially overlapping carriers, or any combination thereof.

As described herein, UE 115-*a* may report a time-domain model and/or one or more parameters on how a phase of ports used to transmit reference signals change across time. For example, UE 115-*a* may transmit transmission parameters 215 on resources of carrier 205 to base station 105-*a* to indicate how the phase changes of different ports used to transmit one or more reference signals 220 (e.g., on resources of carrier 210). As discussed with reference to FIG. 1, UE 115-*a* may transmit the reference signals 220 according to a reference signal resource set that includes one or more reference signal resources (e.g., each consisting of one or more adjacent symbols). Accordingly, UE 115-*a* may transmit each reference signal resource of a reference signal resource set according to the transmission parameters 215 to enable base station 105-*a* to bundle the reference signal resources. For example, a first reference signal 220-*a* may be considered a first reference signal resource of a first reference signal resource set, a second reference signal 220-*b* may be considered a second reference signal resource of the first reference signal resource set, and a third reference signal 220-*c* may be considered a third reference signal resource of the first reference signal resource set, where each of these reference signals 220 of the first reference signal resource set is transmitted according to the transmission parameters 215.

In some examples, the transmission parameters 215 may indicate a phase of one of the reference signals 220 and/or how the phase changes across time for the reference signals 220 such that base station 105-*a* can bundle the reference signals 220 together (e.g., for a certain usage) based on being indicated with the phase and/or how the phase changes for the reference signals 220. For example, base station 105-*a* may bundle the first reference signal 220-*a*, the second reference signal 220-*b*, and the third reference signal 220-*c* (e.g., reference signal resources) to perform a procedure according to an intended usage for the reference signals 220. In some examples, the intended usage of the reference signals 220 may include base station 105-*a* determining a position of UE 115-*a* based on the reference signals 220, performing an antenna selection for base station 105-*a* and/or UE 115-*a* based on the reference signals 220, determining whether to use a codebook or not for subsequent communications with UE 115-*a* based on the reference signals 220, performing a beam refinement procedure based on the reference signals 220, etc. As such, base station 105-*a* may use the transmission parameters 215 to identify phases of the reference signals 220 to enable the bundling, to determine whether the reference signals 220 can be bundled, or both.

When transmitting an indication of the transmission parameters 215, UE 115-*a* may indicate a time window where the transmission parameters 215 are valid or constant. For example, as shown, the transmission parameters 215 may apply to the reference signals 220 from a first time (t1) to a second time (t2). As such, if base station 105-*a* receives a reference signal 220 within a time window (e.g., time gap) that spans from t1 to t2, base station 105-*a* may determine that the transmission parameters 215 are applicable to the reference signal 220 (e.g., to determine a phase of the reference signal 220) for bundling the reference signal 220 with additional reference signals 220 received during the time window. For example, different time windows (e.g., time gaps) may correspond to different transmission parameters 215. That is, a first set for the transmission parameters 215 may apply to reference signals 220 transmitted/received between a first time and a second time (e.g., from 0 ms to 10 ms), and a second set for the transmission parameters 215 may apply to reference signals 220 transmitted/received between the second time and a third time (e.g., from 10 ms to 40 ms), where the first set and the second set of the transmission parameters 215 can be the same or different.

The transmission parameters 215 may include a report of a parametrized model on how the phase may drift across time which would indicate the rate that the absolute phase drifts for each port used to transmit a reference signal 220. For example, UE 115-*a* may indicate a first model for transmission of the reference signals 220 for the time window from t1 to t2, where the first model is based on a time phase drift rate ($r_{drift}$). Equation 1 below may represent the first model.

$$\phi_{p_i}(t_2) = \phi_{p_i}(t_1) + r_{drift} \cdot (t_2 - t_1) + \delta(t_2) \text{ for } |t_2 - t_1| \leq T_{thresh}^{(1)} \tag{1}$$

$\phi_{p_i}$ may represent a phase for port i at a given time (e.g., t1, t2, etc.), $r_{drift}$ may represent the time phase drift rate, $\delta(t)$ may represent a variance on an uncertainty (e.g., an error rate) of the parameters in the first model at a given time, and thresh may represent a threshold absolute value of a time window where the model (e.g., the first model) is valid. In some examples, UE 115-*a* may transmit an indication of the variance on the uncertainty of the parameters in the first model ($\delta(t)$), or the variance on the uncertainty may be determined by base station 105-*a* (e.g., a defined value). Additionally, the variance on the uncertainty of the parameters in the first model may be indicated or defined based on $|\delta(t)| \Delta_{model}$, where $\Delta_{model}$ represents a threshold variance value for the first model.

Additionally or alternatively, if the time phase drift rate is not known to UE 115-*a* or a different model is applicable for the reference signals 220 during a same or different time window, UE 115-*a* may indicate a second model for transmission of the reference signals for a time window from t1 to t2. Equation 2 below may represent the second model.

$$|\phi_{p_i}(t_2) - \phi_{p_i}(t_1)| \leq \phi_{max} \text{ for } |t_2 - t_1| \leq T_{thresh}^{(1)} \tag{2}$$

$\phi_{p_i}$ may represent a phase for port i at a given time (e.g., t1, t2, etc.), $\phi_{max}$ may represent a threshold absolute phase difference value between phases of different reference signals 220 transmitted within the time window, and $T_{thresh}^{(1)}$ may represent a threshold absolute value of a time window where the model (e.g., the second model) is valid.

In some examples, UE 115-$a$ may transmit the report of the parametrized model or the values of the parameter(s) of the model in the indication of the transmission parameters 215 per port. For example, UE 115-$a$ may use multiple ports (e.g., physical antenna ports, virtual antenna ports, etc.) to transmit the reference signals 220 (e.g., a first port for the first reference signal 220-$a$, a second port for the second reference signal 220-$b$, a third port for the third reference signal 220-$c$, a same port for two of the reference signals 220 and a different port for the third reference signal, a same port for each of the reference signal 220, etc.), where the parameterized model, values of parameter(s), or both are used specifically for a corresponding port. In some examples, UE 115-$a$ may perform a testing or a calibration phase for determining models and transmission parameters 215 for the reference signals 220 to enable base station 105-$a$ to bundle the reference signals 220, where the testing or calibration phase occurs prior to transmitting an indication of the transmission parameters 215.

Additionally, UE 115-$a$ may indicate amplitude conditions for an upper bound for both models defined in Equations 1 and 2 above. Equations 3 and 4 below may represent the amplitude conditions.

$$|A_{p_i}(t_2)-A_{p_i}(t_1)| \leq A_{max} \text{ for } |t_2-t_1| \leq T_{thresh}^{(2)} \qquad (3)$$

$$|A_{p_i}(t_2)-A_{p_i}(t_1)| \leq A_{max} \text{ for } T_{thresh}^{(2)} < |t_2-t_1| \leq T_{thresh}^{(3)} \qquad (4)$$

$A_{p_i}$ may represent a power amplitude of a reference signal 220 transmitted on port i at a given time (e.g., t2, t1, etc.), $A_{max}$ and $A_{max}^{(2)}$ may represent a threshold absolute power difference value between two reference signals 220 transmitted within the time window, and $T_{thresh}^{(2)}$ and $T_{thresh}^{(3)}$ may represent threshold absolute values of a time window where the amplitude conditions are to be met. For example, Equation 3 may indicate amplitude conditions to be met (e.g., less than or equal to a first threshold absolute power difference value, $A_{max}$) for bundling reference signals 220 received at t1 and t2, where t2 and t1 are less than or equal to a first threshold absolute value of a time window (e.g., $T_{thresh}^{(2)}$). Additionally or alternatively, Equation 4 may indicate amplitude conditions to be met (e.g., less than or equal to a first threshold absolute power difference value, $A_{max}$) for bundling reference signals 220 received at t1 and t2, where t2 and t1 are greater than the first threshold absolute value of the time window but less than or equal to a second threshold absolute value of a time window (e.g., $T_{thresh}^{(3)}$).

In some examples, UE 115-$a$ may not report the $r_{drift}$ value but may report the time during which base station 105-$a$ (e.g., a receiving device) can be configured such that a reported model/parameters (e.g., the value of $r_{drift}$) remains constant. For example, UE 115-$a$ may report a threshold time difference of $t_2-t_1$ (e.g., a maximum time difference) for which an $r_{drift}$ is valid. Subsequently, for any two (2) reference signals 220 which are transmitted farther apart then the threshold time difference, then accuracy conditions (e.g., Equations 1, 2, 3, and/or 4) for an absolute difference in phase may not be met. Additionally, base station 105-$a$ may determine to not bundle two reference signals 220 together based on the transmission parameters 215 using the parameters and models as indicated above by Equations 1, 2, 3, and 4 if the time between reception of the two reference signals 220 exceeding the threshold time difference of $t_2-t_1$. That is, UE 115-$a$ may not guarantee that the conditions and parameters indicated above by Equations 1, 2, 3, and 4 are valid outside of the threshold time difference of $t_2-t_1$ (e.g., if the threshold time difference exceeds a corresponding $T_{thresh}$ value, base station 105-$a$ may not use a corresponding Equation for determining phases of the ports used for transmitting the reference signals 220 for bundling the reference signals 220).

Additionally, UE 115-$a$ and base station 105-$a$ may determine whether a model and/or if parameters of the model are valid between two reference signals 220 if any, all, or any combination of the below constraints are met within the specified time window. For example, the model and/or parameters of the model may be considered valid if UE 115-$a$ is not signalled with a change in a number of ports used for transmitting the reference signals (e.g., in a configuration message for the reference signals) or with a configuration change for an uplink channel (e.g., a change in a configuration for a PUSCH, such as a change in a PUSCH-config), if UE 115-$a$ remains in a DRX active time (e.g., UE 115-$a$ does not enter an 'OFF' period of a DRX configuration), if no measurement gap occurs, if an active BWP remains the same for UE 115-$a$, a dual connectivity and carrier aggregation configuration remain unchanged for UE 115-$a$ (e.g., UE 115-$a$ is not configured or de-configured with a primary secondary cell (PScell), one or more secondary cells (SCell(s)), etc.), a transmission power of the reference signals 220 satisfies a threshold value (e.g., reference signal transmission power $\geq X$ dBm, where X is a UE capability reported by UE 115-$a$ or another parameter of the model), or any combination thereof. When any of the above constraints happen and for any reference signal transmitted/received before a first time (t1) and after a second time (t2) (e.g., an event), the model may change to the second model defined by Equation 2 above.

In some examples, UE 115-$a$ may report different model parameters and transmission parameters 215

$$\left(\text{e.g., } r_{drift}, T_{thresh}^{(1)}, A_{max}, \phi_{max}, T_{thresh}^{(2)}\right)$$

for different transmission characteristics. For example, the different transmission characteristics may include specific model parameters and transmission parameters 215 that are applicable for separate transmission characteristics. That is, UE 115-$a$ may transmit specific model parameters and transmission parameters 215 per reference signal resource or reference signal resource set identifier, per number of ports used for transmitting the reference signal resource, per reference signal usage (e.g., for antenna switching a different model/parameters may be applicable compared to a reference signal with usage of codebook-based), per band, per band combination, per CC, per BWP, or any combination thereof. Accordingly, UE 115-$a$ may use and indicate a first set of transmission parameters 215 that are applicable for a first transmission characteristic, a second set of transmission parameters 215 that are applicable for a second transmission characteristic, etc. Subsequently, base station 105-$a$ (e.g., or an additional receiving device) may identify a transmission characteristic for reference signals 220 received from UE 115-$a$ and apply the corresponding transmission parameters 215 for that identified transmission characteristic for bundling the reference signals 220 (e.g., for determining phases of ports for the reference signals 220 for the bundling).

Additionally or alternatively, UE 115-$a$ may transmit reporting of the different model parameters based on differentials with a basic set of model parameters. For example, UE 115-*a* may report a baseline set of transmission parameters $$\left( e.g., r_{drift}^{0} \right)$$

and then differentially transmit an indication of values for a different set of transmission parameters (e.g., or a single transmission parameter) for different reference signal resources or reference signal resource sets that are differentials of the values in the baseline set of transmission parameters (e.g., differences between the baseline set of transmission parameters and the transmission parameter(s) of the reference signal resources or reference signal resource sets are signaled).

In some examples, UE 115-*a* may report the transmission parameters via RRC signaling (e.g., higher-layer signaling), in a UE capability message, a MAC-CE, or any combination thereof. Additionally, the techniques for indicating the transmission parameters 215 to enable base station 105-*a* to bundle the reference signals 220 may be used for different types of reference signals. For example, base station 105-*a* may use the transmission parameters 215 to bundle SRSs, DMRSs, or additional uplink reference signals transmitted by UE 115-*a* across time. As such, UE 115-*a* may report a same model that can be used for different types of reference signals (e.g., for both SRS and DMRS) or may report different models and/or parameters of the model per type of reference signal (e.g., a first model/set of model parameters for bundling SRSs, a second model/set of model parameters for bundling DMRSs, etc.).

Additionally, while a base station 105-*a* is shown communicating with UE 115-*a* in the example of wireless communications system 200, an additional wireless device (e.g., a second UE 115, another device capable of communicating with UE 115-*a*, etc.) may use the techniques described herein. For example, UE 115-*a* may transmit the transmission parameters 215 to a second UE 115 to enable the second UE 115 to bundle two or more sidelink reference signals transmitted by UE 115-*a*.

Figures 3A, 3B, 3C:
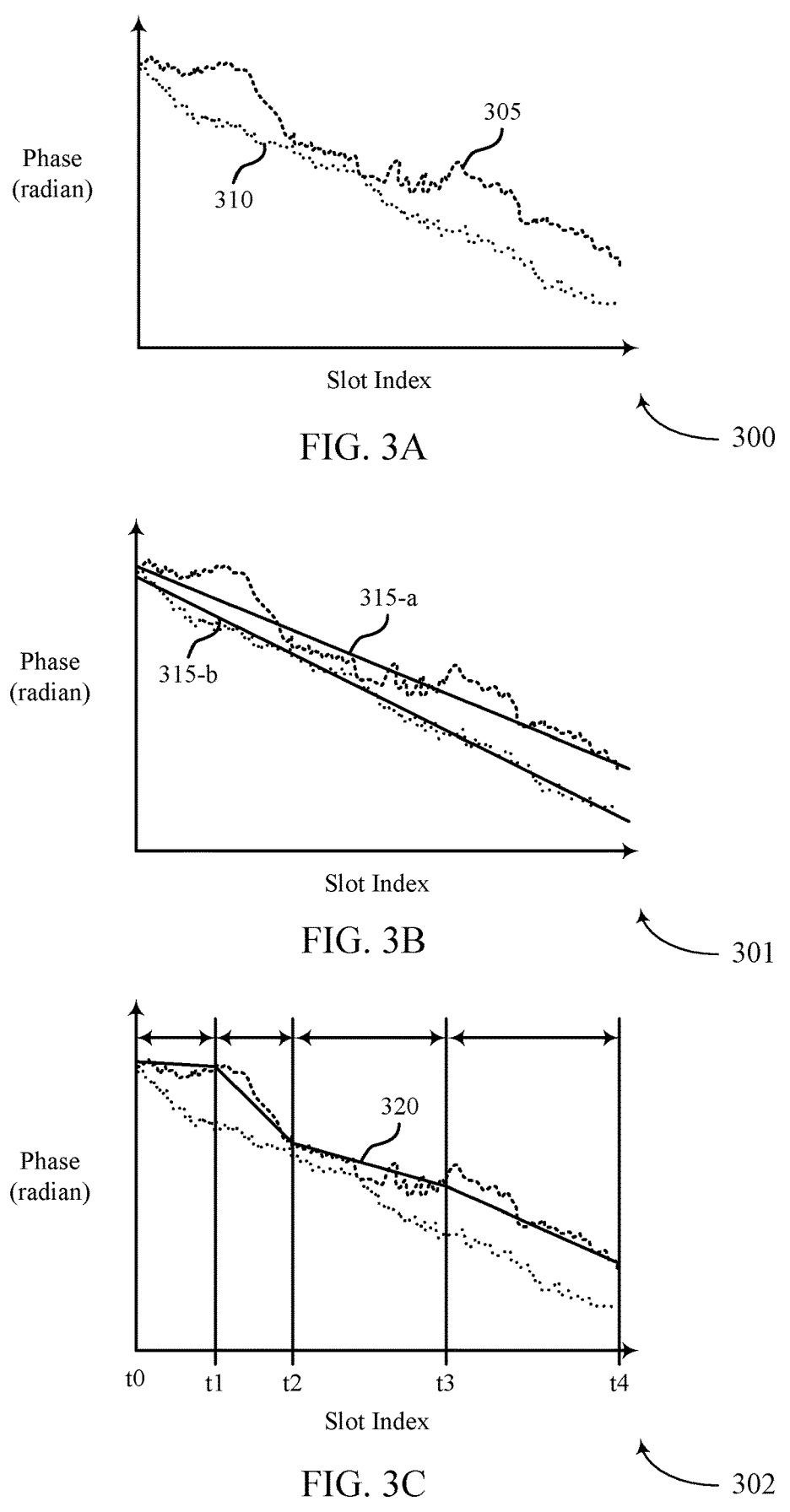

FIGS. 3A, 3B, and 3C illustrate examples of a phase drift report 300, a phase drift report 301, and a phase drift report 302, respectively, that support reference signal phase time drift model reporting for reference signal time-domain coherency in NR in accordance with aspects of the present disclosure. In some examples, phase drift reports 300, 301, and 302 may implement aspects of or may be implemented by aspects of wireless communications system 100, wireless communications system 200, or both. For example, phase drift reports 300, 301, and 302 may represent how a phase changes across time for a port used by a UE 115 for transmitting reference signals to a receiving device (e.g., a base station 105, an additional UE 115, etc.).

Phase drift report 300 may represent how a phase of the port changes as time progresses (e.g., as a slot index increases) for different transmission powers. For example, a first phase drift 305 may represent a maximum power transmission, and a second phase drift 310 may represent a 0 dBm transmission. As shown, the phase of the port changes in an unpredictable manner across time as a transmission power increases, where the second phase drift 310 (e.g., representing the 0 dBm transmission) is more linear than the first phase drift 305 (e.g., representing the maximum power transmission).

Phase drift report 301 may include different phase drift values 315 (e.g., $r_{drift}$) that the UE 115 can report for representing the different phase drifts (e.g., for different power levels). For example, the UE 115 may determine and report a first phase drift value 315-*a* for the first phase drift 305 and a second phase drift value 315-*b* for the second phase drift 310. In some examples, the UE 115 may indicate the different phase drift values 315 when transmitting an indication of transmission parameters for the receiving device to use for bundling reference signals transmitted from the port, where the receiving device can use the phase drift values 315 to determine phases of the reference signals for the bundling. However, the phase drift values 315 may be determined across a large time, which may result in the phase drift values 315 not being as accurate of a representation of the phase for the port.

Phase drift report 302 may represent a piecewise linear model 320 reporting that the UE 115 can indicate when transmitting the indication of the transmission parameters to the receiving device. For example, the UE 115 may indicate different time windows where transmission parameters can be viewed or interpreted as valid/constant such that a phase drift rate can be considered constant during the time windows, resulting in the piecewise linear model 320. As shown, the UE 115 may determine and indicate a first set of transmission parameters for a first phase drift rate from a first time (t0) to a second time (t1), a second set of transmission parameters for a second phase drift rate from the second time (t1) to a third time (t2), a third set of transmission parameters for a third phase drift rate from the third time (t2) to a fourth time (t3), and a fourth set of transmission parameters for a fourth phase drift rate from the fourth time (t3) to a fifth time (t4). Accordingly, the receiving device may determine (e.g., estimate) a phase of the port for different reference signals to enable bundling the reference signals based on the one or more sets of transmission parameters and the corresponding phase drift rates.

Figure 4A:
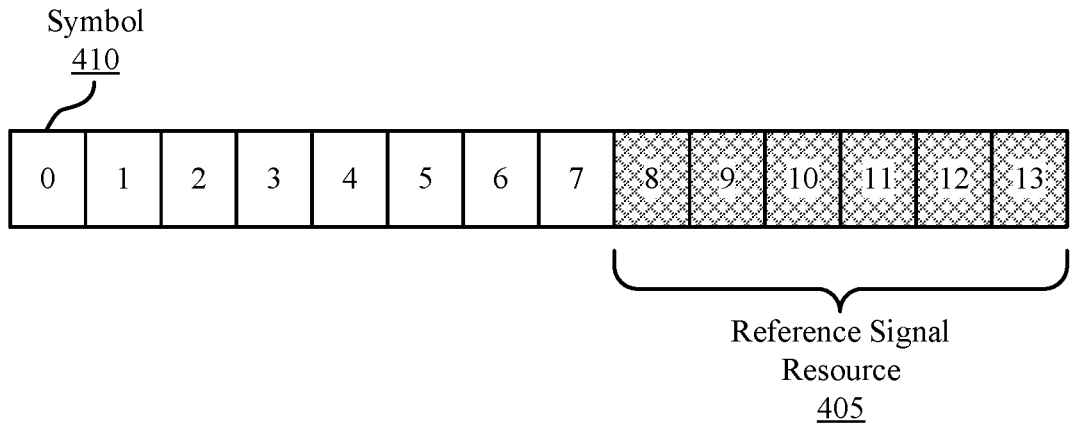
FIGS. 4A and 4B illustrate examples of reference signal resource configurations that support reference signal phase time drift model reporting for reference signal time-domain coherency in NR in accordance with aspects of the present disclosure.
Figure 4B:
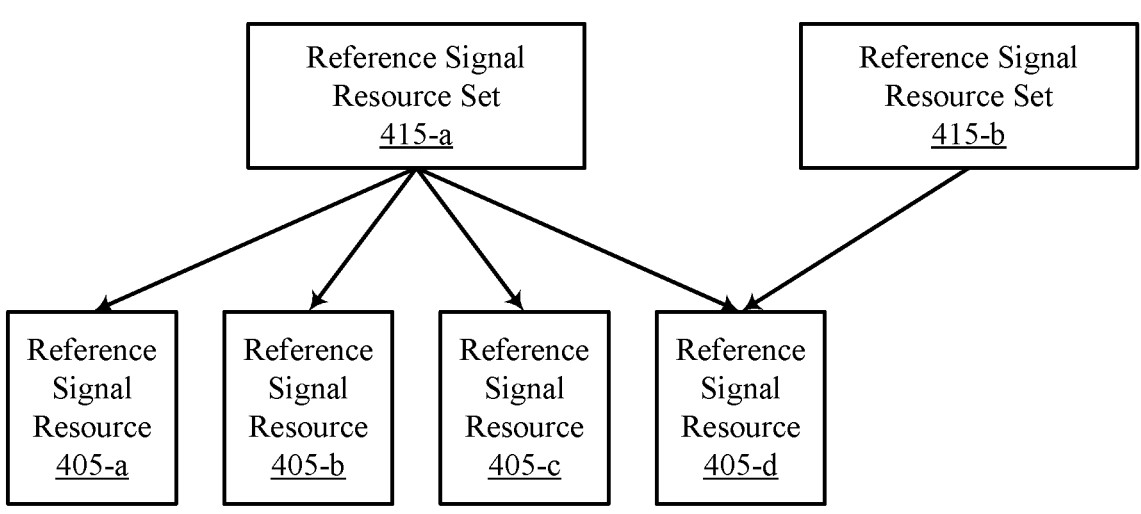

FIGS. 4A and 4B illustrate examples of a reference signal resource configuration 400 and a reference signal resource configuration 401, respectively, that support reference signal phase time drift model reporting for reference signal time-domain coherency in NR in accordance with aspects of the present disclosure. In some examples, reference signal resource configurations 400 and 401 may implement aspects of or may be implemented by aspects of wireless communications system 100, wireless communications system 200, or both. For example, a UE 115 may transmit one or more reference signals to a receiving device (e.g., a base station 105, an additional UE 115, etc.) using the reference signal resource configurations 400 and 401. Subsequently, as described herein, the receiving device may bundle the one or more reference signals as part of mechanisms to enhance reference signal capacity and/or coverage for handling the reference signals. As such, the UE 115 may transmit an indication of one or more sets of transmission parameters to the receiving device to enable the bundling.

For reference signal resource configuration 400, when transmitting the reference signals to the receiving device, the UE 115 may transmit the reference signals using one or more reference signal resources 405. For example, the reference signal resources 405 may span 'X' symbols 410 in a slot (e.g., 1, 2, 4 adjacent symbols 410, up to 12 symbols) with one or more ports (e.g., up to four (4) ports) per reference signal resource 405. In some examples, all ports of a reference signal resource 405 (e.g., an SRS resource) may be sounded in each symbol. Additionally, as shown, the UE 115 may transmit a reference signal resource 405 in the last six (6) symbols 410 of a slot. Additionally or alternatively, the UE 115 may transmit the reference signal resource 405 on a number of adjacent symbols 410 within the slot. In some examples, the UE 115 may transmit a reference signal after transmitting an uplink channel (e.g., a PUSCH) in that slot. Additionally, in some examples, the UE 115 may use a same port for transmitting each symbol 410 of a reference signal resource 405.

For reference signal resource configuration 401, the UE 115 may transmit one or more reference signal resources 405 using a reference signal resource set 415. For example, the reference signal resource set 415 may contain multiple reference signal resources 405 transmitted by the UE 115. In some examples, the UE 115 may transmit a reference signal resource set 415 aperiodically (e.g., triggered or signaled by downlink control information (DCI)), semi-persistently, periodically, etc.

Additionally, the UE 115 may be configured with multiple reference signal resources 405, which can then be grouped into different reference signal resource sets 415 depending on a use case configured for the reference signals, reference signal resources 405, and/or reference signal resource sets 415 (e.g., positioning, antenna switching, codebook-based, non-codebook based, beam management, etc.). For example, a first reference signal resource set 415-*a* may include a first reference signal resource 405-*a*, a second reference signal resource 405-*b*, a third reference signal resource 405-*c*, and a fourth reference signal resource 405-*d*, where the first reference signal resource set 415-*a* is configured for a first usage (e.g., antenna selection). Additionally, a second reference signal resource set 415-*b* may include the fourth reference signal resource 405-*d* and be configured for a second usage (e.g., codebook-based). In some examples, the reference signal transmissions may be wideband or subband, and bandwidths used for the reference signal transmissions may include multiples of four (4) physical resource blocks.

Based on the techniques described herein, the receiving device may bundle the different reference signal resources 405 that constitute a reference signal resource set 415. For example, the one or more sets of transmission parameters indicated by the UE 115 may enable the receiving device to determine different characteristics/parameters (e.g., phases) of each reference signal resource 405 for the bundling and if the transmission parameters can be used for the bundling.

Figure 5:
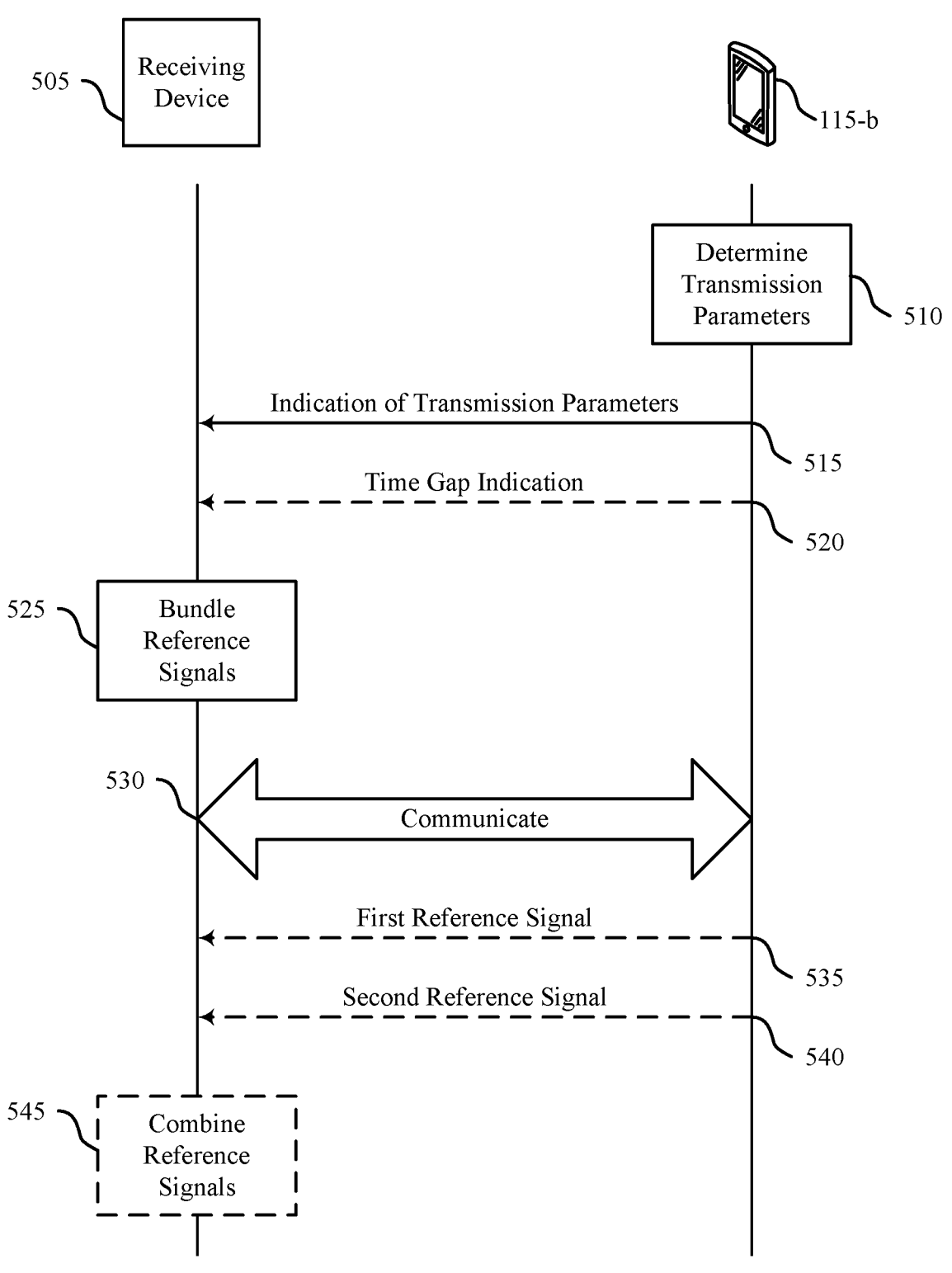
FIG. 5 illustrates an example of a process flow that supports reference signal phase time drift model reporting for reference signal time-domain coherency in NR in accordance with aspects of the present disclosure.

FIG. 5 illustrates an example of a process flow 500 that supports reference signal phase time drift model reporting for reference signal time-domain coherency in NR in accordance with aspects of the present disclosure. In some examples, process flow 500 may implement aspects of or may be implemented by aspects of wireless communications system 100, wireless communications system 200, or both. For example, process flow 500 may include a UE 115-*b*, which may be an example of a UE 115 as described with reference to FIGS. 1-4. Additionally, process flow 500 may include a receiving device 505, which may be an example of a base station 105, an additional UE 115 (e.g., a second UE 115), an additional wireless device, or any combination thereof, as described herein.

In the following description of process flow 500, the operations between UE 115-*b* and receiving device 505 may be transmitted in a different order than the order shown, or the operations performed by UE 115-*b* and receiving device 505 may be performed in different orders or at different times. Certain operations may also be left out of process flow 500, or other operations may be added to process flow 500. It is to be understood that while base station UE 115-*b* and receiving device 505 are shown performing a number of the operations of process flow 500, any wireless device may perform the operations shown.

At 510, UE 115-*b* may determine one or more sets of transmission parameters associated with a reference signal type, where the one or more sets of transmission parameters are determined for enabling the receiving device 505 to bundle reference signals of the reference signal type. For example, the reference signal type may include an SRS, a DMRS, an uplink reference signal, a sidelink reference signal, or any combination thereof. In some examples, a set of the one or more sets of transmission parameters may include a time phase drift rate, one or more time difference threshold values, an amplitude threshold value, a phase threshold value, or any combination thereof. Additionally or alternatively, a set of the one or more sets of transmission parameters may include a time-domain model for enabling the bundling of the reference signals at the receiving device 505.

In some examples, UE 115-*b* may determine each set of transmission parameters of the one or more sets of transmission parameters based on a transmission characteristic for which each set of transmission parameter applies. For example, the transmission characteristic for which each set of transmission parameter is applicable may include a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a CC used for transmitting the reference signals, a BWP used for transmitting the reference signals, the reference signal type, or any combination thereof.

At 515, UE 115-*b* may transmit, to the receiving device 505, an indication of the one or more sets of transmission parameters, where the indication is associated with how a characteristic of one or more ports of UE 115-*b* varies across time. For example, the characteristic of how the one or more ports of UE 115-*b* varies across time may include a phase of the one or more ports (e.g., that varies across time). In some examples, UE 115-*b* may transmit the indication of the one or more sets of transmission parameters via RRC signaling, a UE capability message, a MAC-CE, or any combination thereof. Additionally, UE 115-*b* may transmit the indication of the one or more sets of transmission parameters per port of UE 115-*b*. In some examples, UE 115-*b* may transmit a variance on an uncertainty of the one or more sets of transmission parameters, where the variance on the uncertainty includes an error rate.

Additionally or alternatively, UE 115-*b* may transmit a baseline set of transmission parameters, where each of the one or more transmission parameters includes a different set of transmission parameters based on the baseline set of transmission parameters (e.g., differential sets of transmission parameters from the baseline set), and communicating with the receiving device 505 may be based on transmitting the baseline set of transmission parameters. In some examples, UE 115-*b* may transmit the indication of the one or more sets of transmission parameters based on the one or more sets of transmission parameters being valid between transmission of two reference signals of the reference signal type, where the one or more sets of transmission parameters are valid based on a number of ports used for transmitting the two reference signals not changing, a DRX active time remaining active for UE 115-*b*, whether a measurement gap occurs between transmission of the two reference signals, maintaining an active BWP, maintaining a dual connectivity configuration, maintaining a carrier aggregation configuration, a transmission power of the two reference signals satisfying a power threshold value, or any combination thereof.

At 520, UE 115-*b* may transmit a time gap indication (e.g., indication of time windows) for each set of the one or more sets of transmission parameters, where the time gap indication includes a time duration where a set of transmission parameters is constant. In some examples, each set of the one or more sets of transmission parameters may be valid for a separate time gap. In some examples, the time gap indication may include a time difference for which a time phase drift value is valid.

At 525, the receiving device 505 may bundle reference signals of the reference signal type that are transmitted by UE 115-*b* based on the indication of the one or more sets of transmission parameters.

At 530, UE 115-*b* may communicate with the receiving device 505 based on the one or more sets of transmission parameters.

At 535, the receiving device 505 may receive, from UE 115-*b*, a first reference signal of the reference signal type. In some examples, receiving device 505 may receive the first reference signal at a first time (t1).

At 540, the receiving device 505 may receive, from UE 115-*b*, a second reference signal of the reference signal type. In some examples, receiving device 505 may receive the second reference signal at a second time (t2).

At 545, the receiving device 505 may combine the first reference signal and the second reference signal based on the one or more sets of transmission parameters for the bundling of the reference signals. In some examples, the receiving device 505 may determine that a difference between the second time and the first time is greater than the time duration indicated by the time gap indication, where the first reference signal and the second reference signal are not bundled based on the difference between the second time and the first time being greater than the time duration and the set of transmission parameters not being constant for the difference between the second time and the first time.

Figure 6:
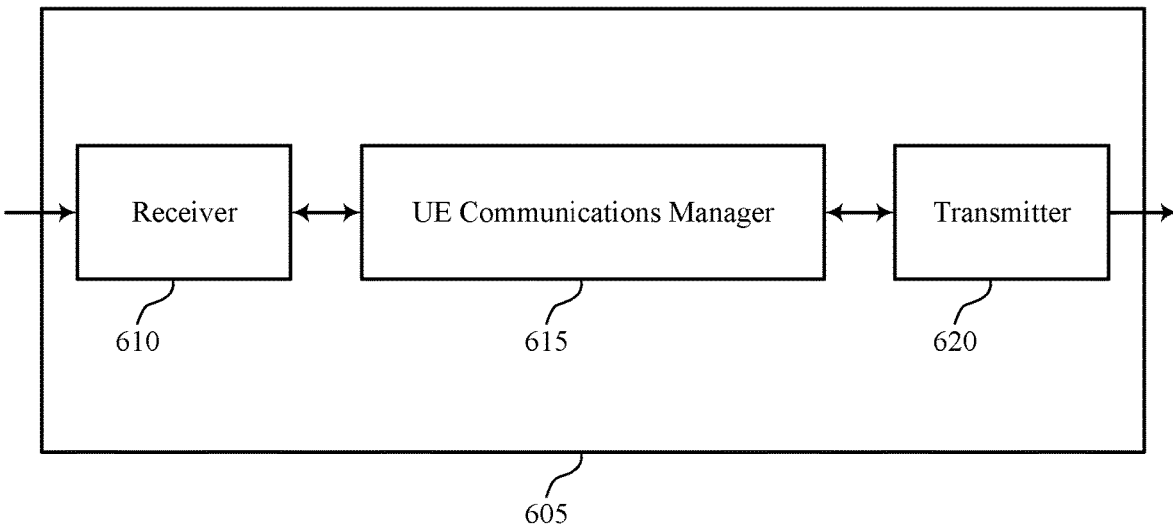
FIGS. 6 and 7 show block diagrams of devices that support reference signal phase time drift model reporting for reference signal time-domain coherency in NR in accordance with aspects of the present disclosure.

FIG. 6 shows a block diagram 600 of a device 605 that supports reference signal phase time drift model reporting for reference signal time-domain coherency in NR in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to reference signal phase time drift model reporting for reference signal time-domain coherency in NR, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may determine one or more sets of transmission parameters associated with a reference signal type, the one or more sets of transmission parameters for enabling a receiving device to bundle reference signals of the reference signal type. The UE communications manager 615 may transmit, to the receiving device, an indication of the one or more sets of transmission parameters, the indication associated with how a characteristic of one or more ports of the UE varies across time. In some examples, the UE communications manager 615 may communicate with the receiving device based on the one or more sets of transmission parameters. The UE communications manager 615 may be an example of aspects of the UE communications manager 910 described herein.

In some examples, the UE communications manager 615 as described herein may be implemented to realize one or more potential advantages for a UE 115. For example, based on transmitting the indication of the one or more sets of transmission parameters, the UE communications manager 615 may enable the UE 115 to indicate how a phase of one or more ports of the UE varies across time, thereby further enabling a receiving device (e.g., a base station 105, an additional UE 115, etc.) to bundle reference signals based on how the phase of the one or more parts varies across time. As such, the UE communications manager 615 may reduce latency for communications with the receiving device based on preempting retransmissions and providing information to enable the receiving device to successfully receive reference signals.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
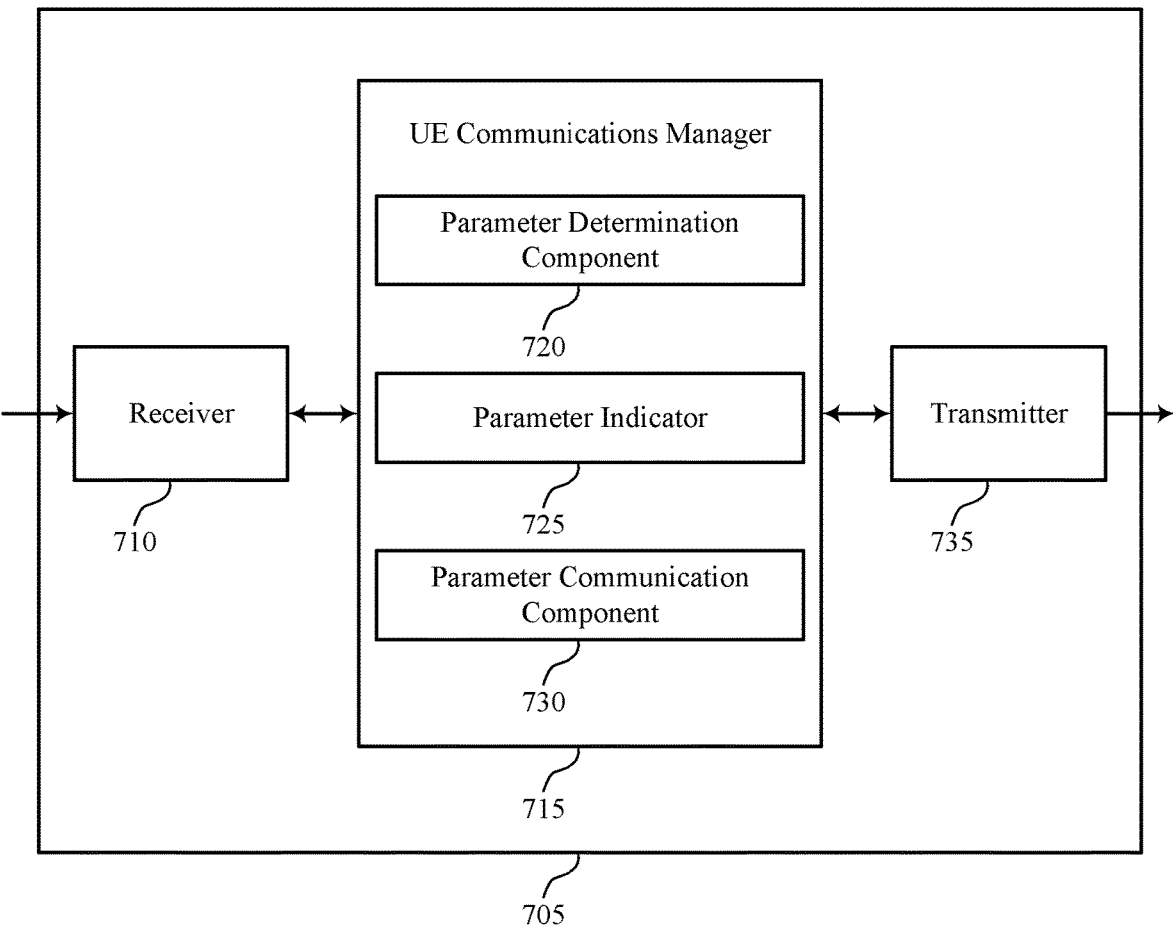

FIG. 7 shows a block diagram 700 of a device 705 that supports reference signal phase time drift model reporting for reference signal time-domain coherency in NR in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to reference signal phase time drift model reporting for reference signal time-domain coherency in NR, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a parameter determination component 720, a parameter indicator 725, and a parameter communication component 730. The UE communications manager 715 may be an example of aspects of the UE communications manager 910 described herein.

The parameter determination component 720 may determine one or more sets of transmission parameters associated with a reference signal type, the one or more sets of transmission parameters for enabling a receiving device to bundle reference signals of the reference signal type.

The parameter indicator 725 may transmit, to the receiving device, an indication of the one or more sets of transmission parameters, the indication associated with how a characteristic of one or more ports of the UE varies across time.

The parameter communication component 730 may communicate with the receiving device based on the one or more sets of transmission parameters.

Based on techniques for determining one or more sets of transmission parameters associated with a reference signal type, a processor of a UE 115 (e.g., controlling the receiver 710, the transmitter 735, or the transceiver 920 as described with reference to FIG. 9) may provide more efficient communications with a receiving device. For example, the one or more sets of transmission parameters may enable the receiving device to bundle reference signals of the reference signal type, thereby enhancing reference signal capacity and/or coverage for handling the reference signals of the reference signal type.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
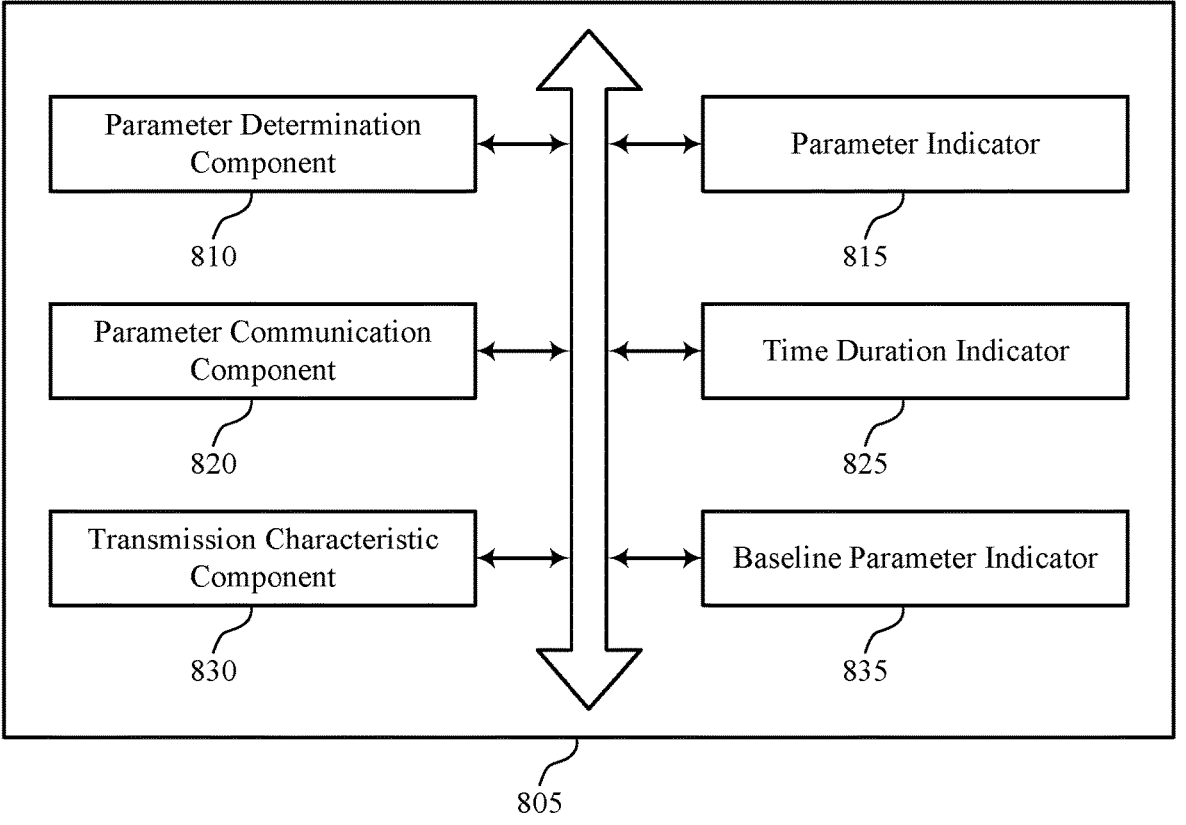
FIG. 8 shows a block diagram of a user equipment (UE) communications manager that supports reference signal phase time drift model reporting for reference signal time-domain coherency in NR in accordance with aspects of the present disclosure.

FIG. 8 shows a block diagram 800 of a UE communications manager 805 that supports reference signal phase time drift model reporting for reference signal time-domain coherency in NR in accordance with aspects of the present disclosure. The UE communications manager 805 may be an example of aspects of a UE communications manager 615, a UE communications manager 715, or a UE communications manager 910 described herein. The UE communications manager 805 may include a parameter determination component 810, a parameter indicator 815, a parameter communication component 820, a time duration indicator 825, a transmission characteristic component 830, and a baseline parameter indicator 835. Each of these modules may communicate, directly or indirectly, with one another (e.g., via one or more buses).

The parameter determination component 810 may determine one or more sets of transmission parameters associated with a reference signal type, the one or more sets of transmission parameters for enabling a receiving device to bundle reference signals of the reference signal type. In some examples, the reference signal type may include an SRS, a DMRS, an uplink reference signal, a sidelink reference signal, or any combination thereof. In some examples, a set of the one or more sets of transmission parameters may include a time phase drift rate, one or more time difference threshold values, an amplitude difference threshold value, a phase difference threshold value, or any combination thereof. Additionally or alternatively, a set of the one or more sets of transmission parameters may include a time-domain model for enabling the bundling of the reference signals at the receiving device.

The parameter indicator 815 may transmit, to the receiving device, an indication of the one or more sets of transmission parameters, the indication associated with how a characteristic of one or more ports of the UE varies across time. In some examples, the characteristic of how the one or more ports of the UE varies across time may include a phase of the one or more ports, an amplitude of the one or more ports, or both. In some examples, the parameter indicator 815 may transmit the indication of the one or more sets of transmission parameters per port of the UE. Additionally, in some examples, the parameter indicator 815 may transmit a variance related to an uncertainty of the one or more sets of transmission parameters (e.g., an error rate).

In some examples, the parameter indicator 815 may transmit the indication of the one or more sets of transmission parameters via RRC signaling, a UE capability message, a MAC-CE, or any combination thereof. Additionally, the parameter indicator 815 may transmit the indication of the one or more sets of transmission parameters based on the one or more sets of transmission parameters being valid between transmission of two reference signals of the reference signal type, the one or more sets of transmission parameters being valid based on a number of ports used for transmitting the two reference signals not changing, a DRX active time remaining active for the UE, whether a measurement gap occurs between transmission of the two reference signals, maintaining an active BWP, maintaining a dual connectivity configuration, maintaining a carrier aggregation configuration, a transmission power of the two reference signals satisfying a power threshold value, or any combination thereof.

The parameter communication component 820 may communicate with the receiving device based on the one or more sets of transmission parameters. In some examples, the receiving device may include a base station, a second UE, an additional wireless device, or any combination thereof.

The time duration indicator 825 may transmit a time gap indication for each set of the one or more sets of transmission parameters, the time gap indication including a time duration where a set of transmission parameters is constant. In some examples, each set of the one or more sets of transmission parameters may be valid for a separate time gap. Additionally, the time gap indication may include a time difference for which a time phase drift value is valid.

The transmission characteristic component 830 may determine each set of transmission parameters of the one or more sets of transmission parameters based on a transmission characteristic for which each set of transmission parameter applies. For example, the transmission characteristic may include a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a CC used for transmitting the reference signals, a BWP used for transmitting the reference signals, the reference signal type, or any combination thereof.

The baseline parameter indicator 835 may transmit a baseline set of transmission parameters, where each of the one or more sets of transmission parameters includes a differential set of values for a corresponding set of transmission parameters based on the baseline set of transmission parameters, and where communicating with the receiving device is based on transmitting the baseline set of transmission parameters.

Figure 9:
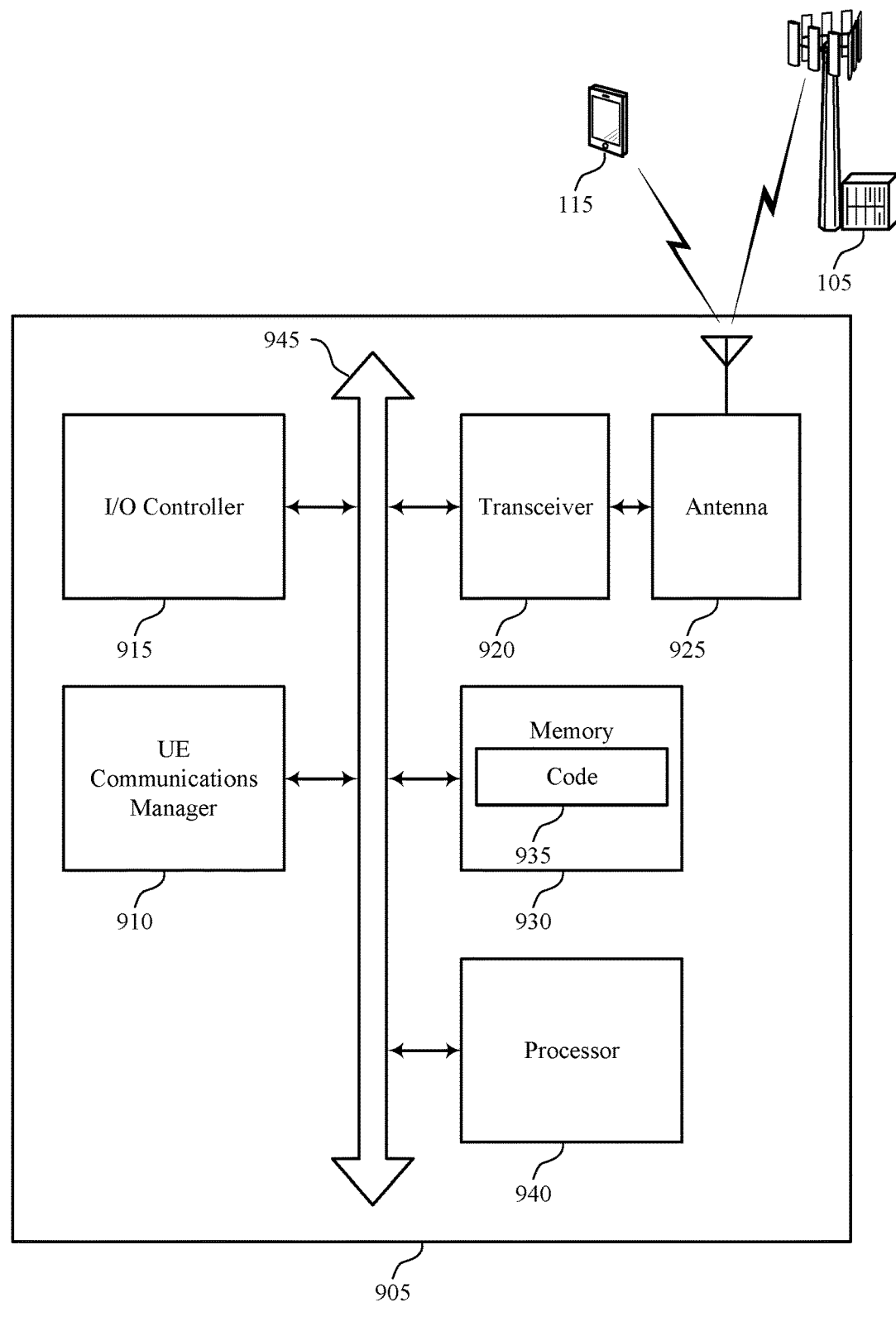
FIG. 9 shows a diagram of a system including a device that supports reference signal phase time drift model reporting for reference signal time-domain coherency in NR in accordance with aspects of the present disclosure.

FIG. 9 shows a diagram of a system 900 including a device 905 that supports reference signal phase time drift model reporting for reference signal time-domain coherency in NR in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may determine one or more sets of transmission parameters associated with a reference signal type, the one or more sets of transmission parameters for enabling a receiving device to bundle reference signals of the reference signal type. The UE communications manager 910 may transmit, to the receiving device, an indication of the one or more sets of transmission parameters, the indication associated with how a characteristic of one or more ports of the UE varies across time. In some examples, the UE communications manager 910 may communicate with the receiving device based on the one or more sets of transmission parameters.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some examples, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting reference signal phase time drift model reporting for reference signal time-domain coherency in NR).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (e.g., when compiled and executed) to perform functions described herein.

Figure 10:
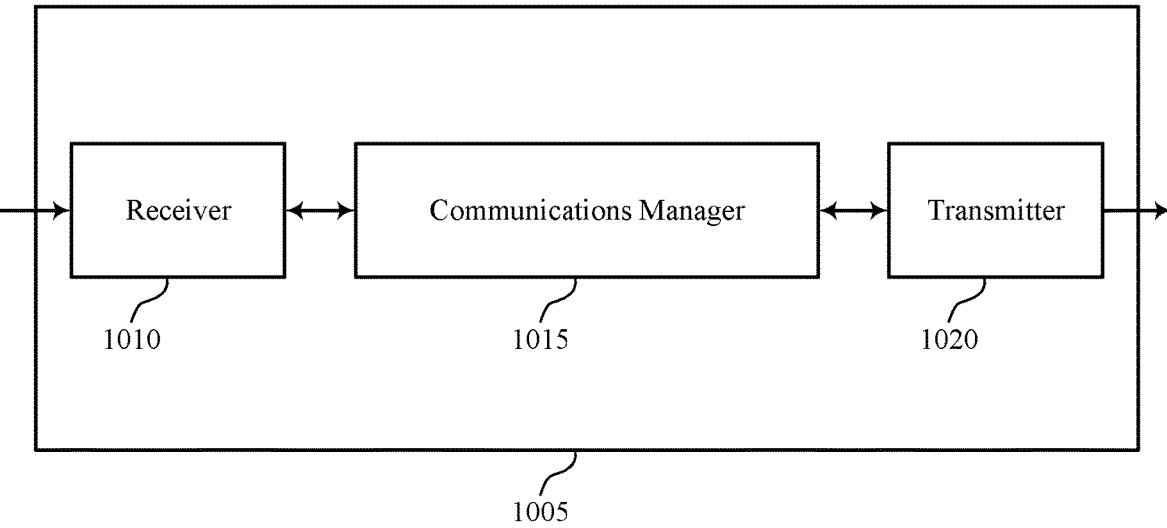
FIGS. 10 and 11 show block diagrams of devices that support reference signal phase time drift model reporting for reference signal time-domain coherency in NR in accordance with aspects of the present disclosure.

FIG. 10 shows a block diagram 1000 of a device 1005 that supports reference signal phase time drift model reporting for reference signal time-domain coherency in NR in accordance with aspects of the present disclosure. The device 1005 may be an example of aspects of a UE 115 or base station 105 as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to reference signal phase time drift model reporting for reference signal time-domain coherency in NR, etc.). Information may be passed on to other components of the device 1005. The receiver 1010 may be an example of aspects of the transceiver 1320 or 1420 as described with reference to FIGS. 13 and 14. The receiver 1010 may utilize a single antenna or a set of antennas.

The communications manager 1015 may receive, from a UE, an indication of one or more sets of transmission parameters for a reference signal type, the indication associated with how a characteristic of one or more ports of the UE varies across time. In some examples, the communications manager 1015 may bundle reference signals of the reference signal type that are transmitted by the UE based on the indication of the one or more sets of transmission parameters. The communications manager 1015 may communicate with the UE based on the one or more sets of transmission parameters and bundling the reference signals of the reference signal type. The communications manager 1015 may be an example of aspects of the communications manager 1310 or 1410 as described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or any combination thereof in accordance with various aspects of the present disclosure.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 or 1420 as described with reference to FIGS. 13 and 14. The transmitter 1020 may utilize a single antenna or a set of antennas.

Figure 11:
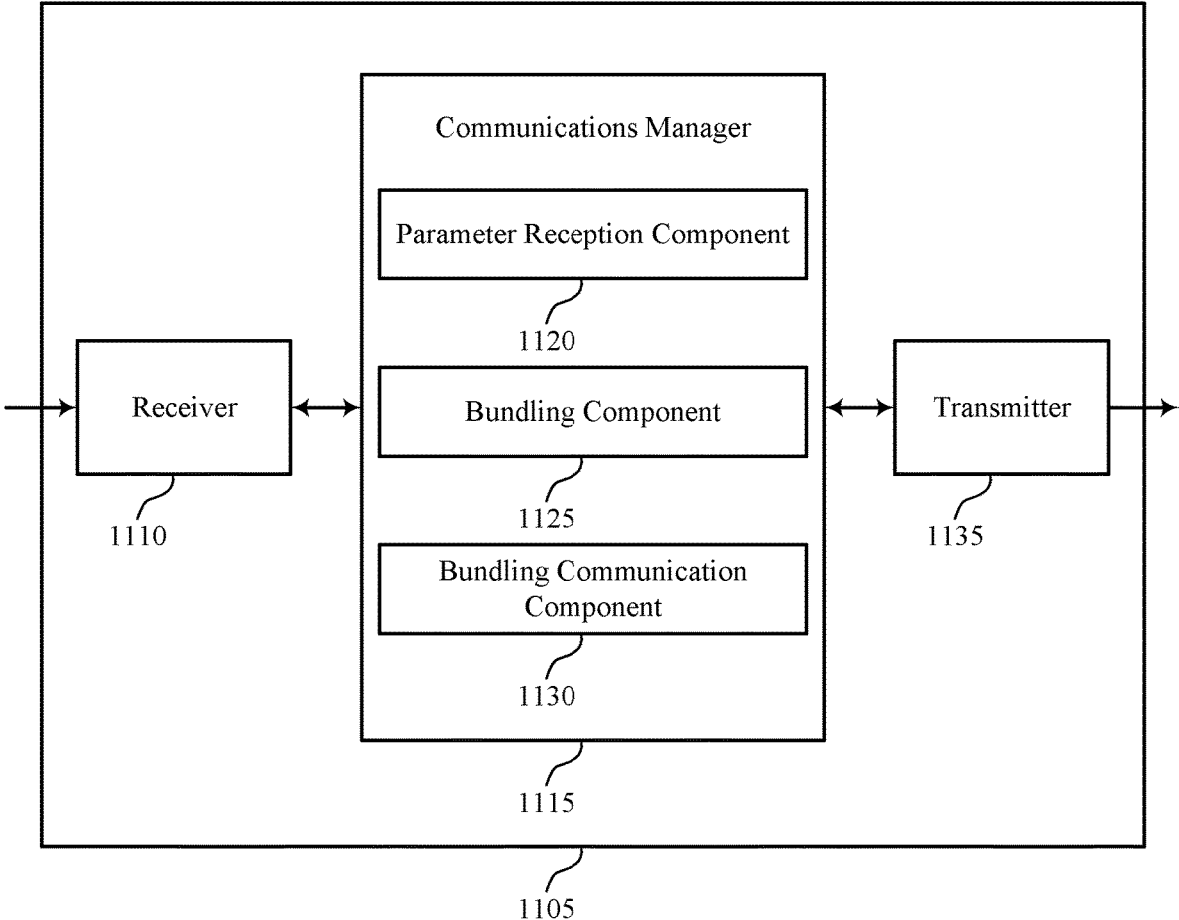

FIG. 11 shows a block diagram 1100 of a device 1105 that supports reference signal phase time drift model reporting for reference signal time-domain coherency in NR in accordance with aspects of the present disclosure. The device 1105 may be an example of aspects of a device 1005, a UE 115, or a base station 105 as described herein. The device 1105 may include a receiver 1110, a communications manager 1115, and a transmitter 1135. The device 1105 may also include a processor. Each of these components may be in communication with one another (e.g., via one or more buses).

Receiver 1110 may receive information such as packets, user data, or control information associated with various information channels (e.g., control channels, data channels, and information related to reference signal phase time drift model reporting for reference signal time-domain coherency in NR, etc.). Information may be passed on to other components of the device 1105. The receiver 1110 may be an example of aspects of the transceiver 1320 or 1420 as described with reference to FIGS. 13 and 14. The receiver 1110 may utilize a single antenna or a set of antennas.

The communications manager 1115 may be an example of aspects of the communications manager 1015 as described herein. The communications manager 1115 may include a parameter reception component 1120, a bundling component 1125, and a bundling communication component 1130. The communications manager 1115 may be an example of aspects of the communications manager 1310 or 1410 as described herein.

The parameter reception component 1120 may receive, from a UE, an indication of one or more sets of transmission parameters for a reference signal type, the indication associated with how a characteristic of one or more ports of the UE varies across time.

The bundling component 1125 may bundle reference signals of the reference signal type that are transmitted by the UE based on the indication of the one or more sets of transmission parameters.

The bundling communication component 1130 may communicate with the UE based on the one or more sets of transmission parameters and bundling the reference signals of the reference signal type.

Transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 or 1420 as described with reference to FIGS. 13 and 14. The transmitter 1135 may utilize a single antenna or a set of antennas.

Figure 12:
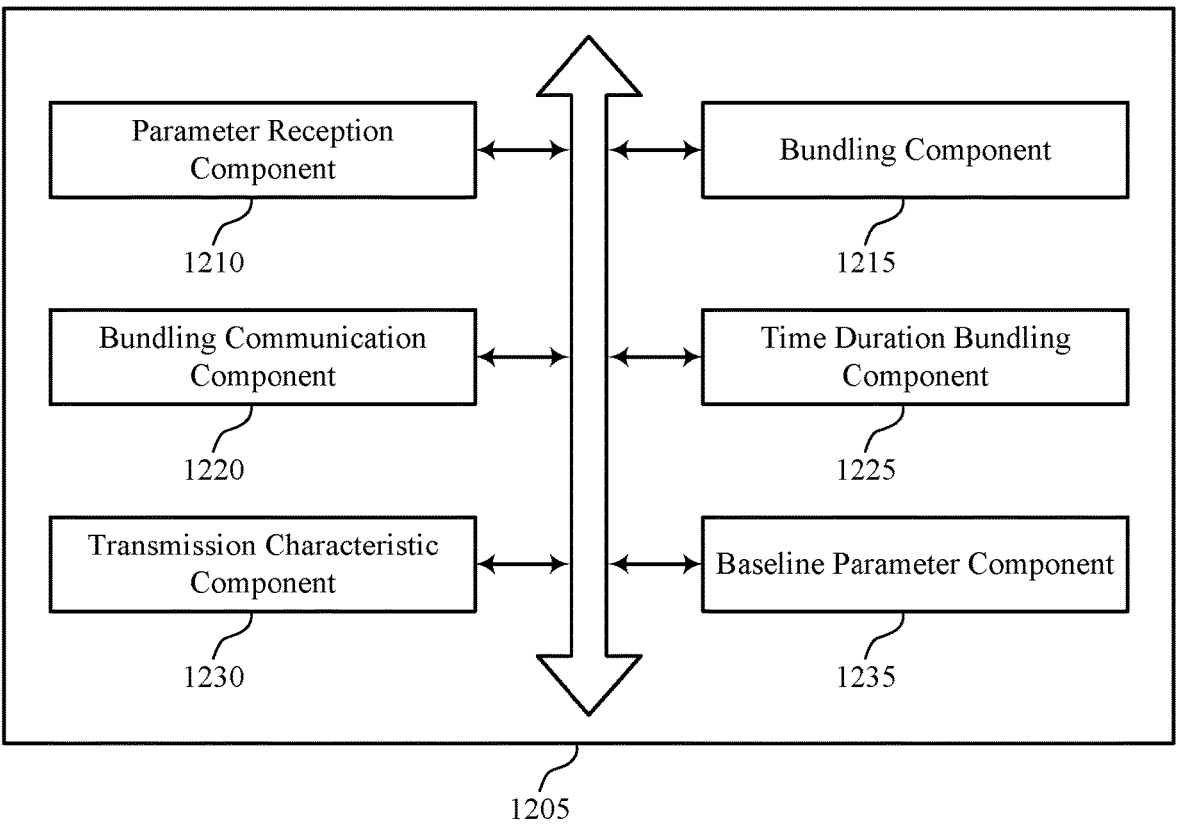
FIG. 12 shows a block diagram of a communications manager that supports reference signal phase time drift model reporting for reference signal time-domain coherency in NR in accordance with aspects of the present disclosure.

FIG. 12 shows a block diagram 1200 of a communications manager 1205 that supports reference signal phase time drift model reporting for reference signal time-domain coherency in NR in accordance with aspects of the present disclosure. The communications manager 1205 may be an example of aspects of a communications manager 1015, a communications manager 1115, or a communications manager 1310 described herein. The communications manager 1205 may include a parameter reception component 1210, a bundling component 1215, a bundling communication component 1220, a time duration bundling component 1225, a transmission characteristic component 1230, and a baseline parameter component 1235. Each of these modules may communicate, directly or indirectly, with one another (e.g., via one or more buses). In some examples, the communications manager 1205 may be used by a receiving device that includes a base station, a second UE, an additional wireless device, or any combination thereof.

The parameter reception component 1210 may receive, from a UE, an indication of one or more sets of transmission parameters for a reference signal type, the indication associated with how a characteristic of one or more ports of the UE varies across time. For example, the characteristic of how the one or more ports of the UE varies across time may include a phase of the one or more ports, an amplitude of the one or more ports, or both. In some examples, a set of the one or more sets of transmission parameters may include a time phase drift rate, one or more time difference threshold values, an amplitude difference threshold value, a phase difference threshold value, or any combination thereof. Additionally, a set of the one or more sets of transmission parameters may include a time-domain model for enabling the bundling of the reference signals at the receiving device. In some examples, the reference signal type may include an SRS, a DMRS, an uplink reference signal, a sidelink reference signal, or any combination thereof.

In some examples, the parameter reception component 1210 may receive the indication of the one or more sets of transmission parameters per port of the UE. Additionally, the parameter reception component 1210 may receive a variance related to an uncertainty of the one or more sets of transmission parameters (e.g., an error rate).

In some examples, the parameter reception component 1210 may receive the indication of the one or more sets of transmission parameters via RRC signaling, a UE capability message, a MAC-CE, or any combination thereof. Additionally, the parameter reception component 1210 may receive the indication of the one or more sets of transmission parameters based on the one or more sets of transmission parameters being valid between transmission of two reference signals of the reference signal type, the one or more sets of transmission parameters being valid based on a number of ports used for transmitting the two reference signals not changing, a DRX active time remaining active for the UE, whether a measurement gap occurs between transmission of the two reference signals, maintaining an active BWP, maintaining a dual connectivity configuration, maintaining a carrier aggregation configuration, a transmission power of the two reference signals satisfying a power threshold value, or any combination thereof.

The bundling component 1215 may bundle reference signals of the reference signal type that are transmitted by the UE based on the indication of the one or more sets of transmission parameters. In some examples, the bundling component 1215 may receive, from the UE, a first reference signal of the reference signal type and may receive, from the UE, a second reference signal of the reference signal type, where bundling the reference signals of the reference signal type includes combining the first reference signal and the second reference signal based on the one or more sets of transmission parameters.

The bundling communication component 1220 may communicate with the UE based on the one or more sets of transmission parameters and bundling the reference signals of the reference signal type.

The time duration bundling component 1225 may receive a time gap indication for each set of the one or more sets of transmission parameters, the time gap indication including a time duration where a set of transmission parameters is constant. In some examples, each set of the one or more sets of transmission parameters may be valid for a separate time gap. Additionally, the time gap indication may include a time difference for which a time phase drift value is valid.

In some examples, the time duration bundling component 1225 may receive, from the UE, a first reference signal of the reference signal type at a first time and may receive, from the UE, a second reference signal of the reference signal type at a second time. Subsequently, in some examples, the time duration bundling component 1225 may determine that a difference between the second time and the first time is greater than the time duration indicated by the time gap indication, where the first reference signal and the second reference signal are not bundled based on the difference between the second time and the first time being greater than the time duration and the set of transmission parameters not being constant for the difference between the second time and the first time.

The transmission characteristic component 1230 may determine each set of transmission parameters of the one or more sets of transmission parameters is applicable for a separate transmission characteristic. In some examples, the transmission characteristic may include a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a CC used for transmitting the reference signals, a BWP used for transmitting the reference signals, the reference signal type, or any combination thereof.

The baseline parameter component 1235 may receive a baseline set of transmission parameters, where each of the one or more sets of transmission parameters includes a differential set of values for a corresponding set of transmission parameters based on the baseline set of transmission parameters, and where communicating with the UE is based on receiving the baseline set of transmission parameters.

Figure 13:
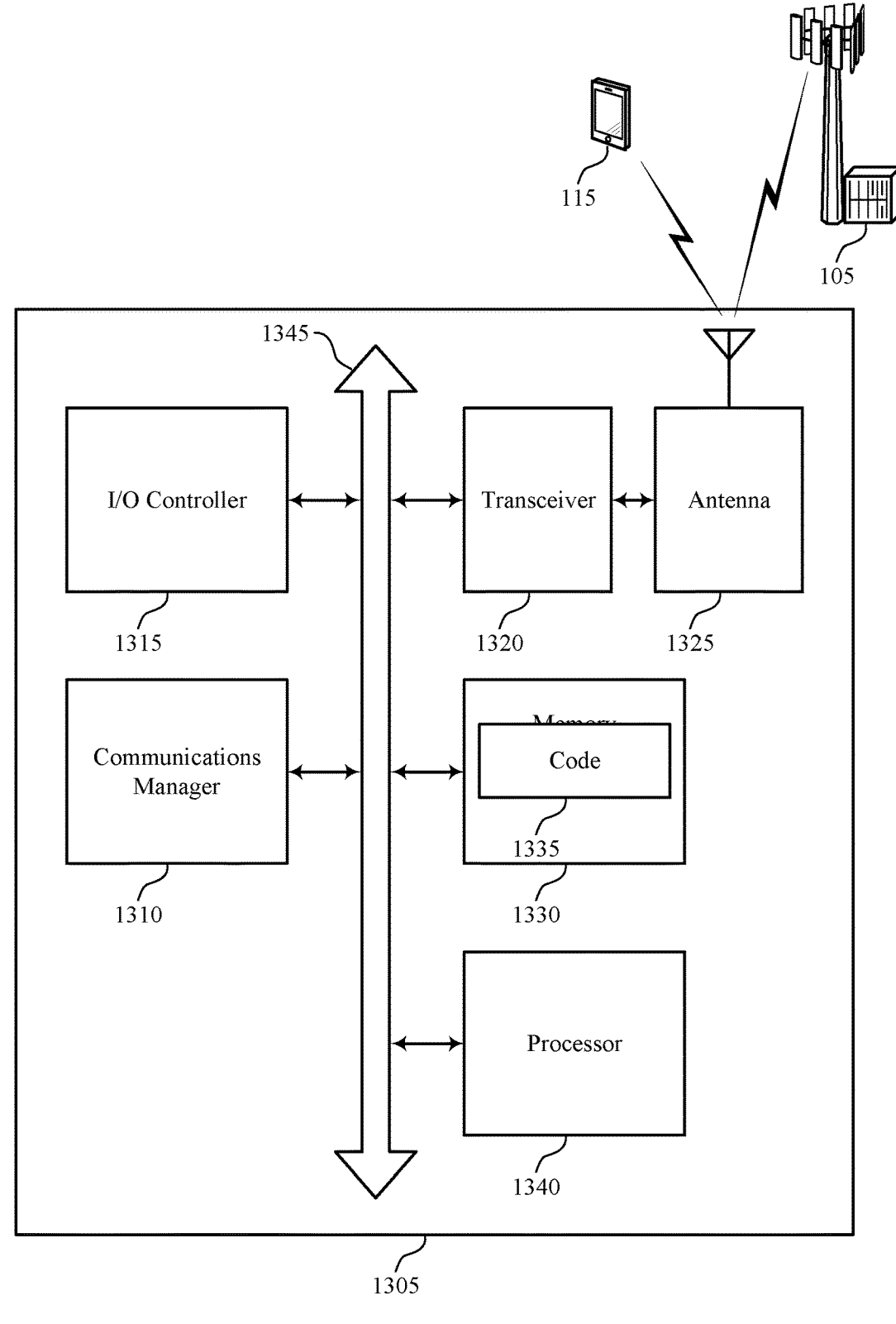
FIG. 13 shows a diagram of a system including a UE that supports reference signal phase time drift model reporting for reference signal time-domain coherency in NR in accordance with aspects of the present disclosure.

FIG. 13 shows a diagram of a system 1300 including a device 1305 that supports reference signal phase time drift model reporting for reference signal time-domain coherency in NR in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, a transceiver 1320, an antenna 1325, memory 1330, a processor 1340, and an I/O controller 1315. These components may be in electronic communication via one or more buses (e.g., bus 1345).

The communications manager 1310 may receive, from a UE, an indication of one or more sets of transmission parameters for a reference signal type, the indication associated with how a characteristic of one or more ports of the UE varies across time. In some examples, the communications manager 1310 may bundle reference signals of the reference signal type that are transmitted by the UE based on the indication of the one or more sets of transmission parameters. The communications manager 1310 may communicate with the UE based on the one or more sets of transmission parameters and bundling the reference signals of the reference signal type.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or any combination thereof. The memory 1330 may store computer-readable code 1335 including instructions that, when executed by a processor (e.g., the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting reference signal phase time drift model reporting for reference signal time-domain coherency in NR).

The I/O controller 1315 may manage input and output signals for the device 1305. The I/O controller 1315 may also manage peripherals not integrated into the device 1305. In some examples, the I/O controller 1315 may represent a physical connection or port to an external peripheral. In some examples, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some examples, the I/O controller 1315 may be implemented as part of a processor. In some examples, a user may interact with the device 1305 via the I/O controller 1315 or via hardware components controlled by the I/O controller 1315.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (e.g., when compiled and executed) to perform functions described herein.

Figure 14:
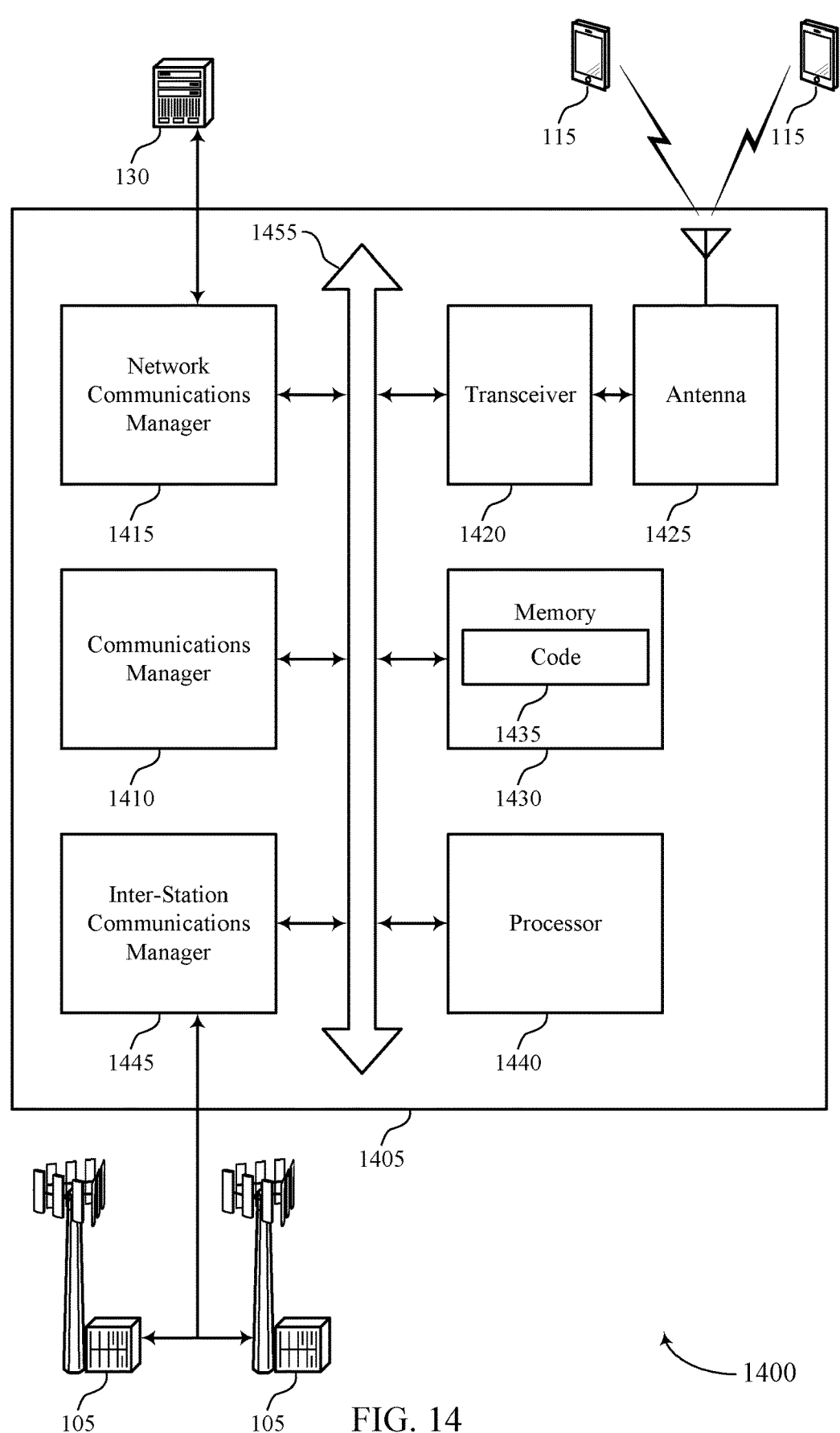
FIG. 14 shows a diagram of a system including a base station that supports reference signal phase time drift model reporting for reference signal time-domain coherency in NR in accordance with aspects of the present disclosure.

FIG. 14 shows a diagram of a system 1400 including a device 1405 that supports reference signal phase time drift model reporting for reference signal time-domain coherency in NR in accordance with aspects of the present disclosure. The device 1405 may be an example of or include the components of device 1005, device 1105, or a base station 105 as described herein. The device 1405 may include components for bi-directional voice and data communications including components for transmitting and receiving communications, including a communications manager 1410, a network communications manager 1450, a transceiver 1420, an antenna 1425, memory 1430, a processor 1440, and an inter-station communications manager 1455. These components may be in electronic communication via one or more buses (e.g., bus 1445).

The communications manager 1410 may receive, from a UE, an indication of one or more sets of transmission parameters for a reference signal type, the indication associated with how a characteristic of one or more ports of the UE varies across time. In some examples, the communications manager 1410 may bundle reference signals of the reference signal type that are transmitted by the UE based on the indication of the one or more sets of transmission parameters. The communications manager 1410 may communicate with the UE based on the one or more sets of transmission parameters and bundling the reference signals of the reference signal type.

Network communications manager 1450 may manage communications with the core network (e.g., via one or more wired backhaul links). For example, the network communications manager 1450 may manage the transfer of data communications for client devices, such as one or more UEs 115.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples the device may have more than one antenna 1425, which may be capable of concurrently transmitting or receiving multiple wireless transmissions.

The memory 1430 may include RAM, ROM, or any combination thereof. The memory 1430 may store computer-readable code 1435 including instructions that, when executed by a processor (e.g., the processor 1440) cause the device to perform various functions described herein. In some examples, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting reference signal phase time drift model reporting for reference signal time-domain coherency in NR).

Inter-station communications manager 1455 may manage communications with other base station 105 and may include a controller or scheduler for controlling communications with UEs 115 in cooperation with other base stations 105. For example, the inter-station communications manager 1455 may coordinate scheduling for transmissions to UEs 115 for various interference mitigation techniques such as beamforming or joint transmission. In some examples, inter-station communications manager 1455 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (e.g., when compiled and executed) to perform functions described herein.

FIG. 15 shows a flowchart illustrating a method 1500 that supports reference signal phase time drift model reporting for reference signal time-domain coherency in NR in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine one or more sets of transmission parameters associated with a reference signal type, the one or more sets of transmission parameters for enabling a receiving device to bundle reference signals of the reference signal type. The operations of 1505 may be performed according to the methods described herein. In some examples, aspects of the operations of 1505 may be performed by a parameter determination component as described with reference to FIGS. 6 through 9.

At 1510, the UE may transmit, to the receiving device, an indication of the one or more sets of transmission parameters, the indication associated with how a characteristic of one or more ports of the UE varies across time. The operations of 1510 may be performed according to the methods described herein. In some examples, aspects of the operations of 1510 may be performed by a parameter indicator as described with reference to FIGS. 6 through 9.

At 1515, the UE may communicate with the receiving device based on the one or more sets of transmission parameters. The operations of 1515 may be performed according to the methods described herein. In some examples, aspects of the operations of 1515 may be performed by a parameter communication component as described with reference to FIGS. 6 through 9.

FIG. 16 shows a flowchart illustrating a method 1600 that supports reference signal phase time drift model reporting for reference signal time-domain coherency in NR in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine one or more sets of transmission parameters associated with a reference signal type, the one or more sets of transmission parameters for enabling a receiving device to bundle reference signals of the reference signal type. The operations of 1605 may be performed according to the methods described herein. In some examples, aspects of the operations of 1605 may be performed by a parameter determination component as described with reference to FIGS. 6 through 9.

At 1610, the UE may transmit, to the receiving device, an indication of the one or more sets of transmission parameters, the indication associated with how a characteristic of one or more ports of the UE varies across time. The operations of 1610 may be performed according to the methods described herein. In some examples, aspects of the operations of 1610 may be performed by a parameter indicator as described with reference to FIGS. 6 through 9.

At 1615, the UE may transmit a time gap indication for each set of the one or more sets of transmission parameters, the time gap indication including a time duration where a set of transmission parameters is constant. The operations of 1615 may be performed according to the methods described herein. In some examples, aspects of the operations of 1615 may be performed by a time duration indicator as described with reference to FIGS. 6 through 9.

At 1620, the UE may communicate with the receiving device based on the one or more sets of transmission parameters. The operations of 1620 may be performed according to the methods described herein. In some examples, aspects of the operations of 1620 may be performed by a parameter communication component as described with reference to FIGS. 6 through 9.

FIG. 17 shows a flowchart illustrating a method 1700 that supports reference signal phase time drift model reporting for reference signal time-domain coherency in NR in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine one or more sets of transmission parameters associated with a reference signal type, the one or more sets of transmission parameters for enabling a receiving device to bundle reference signals of the reference signal type. The operations of 1705 may be performed according to the methods described herein. In some examples, aspects of the operations of 1705 may be performed by a parameter determination component as described with reference to FIGS. 6 through 9.

At 1710, the UE may transmit, to the receiving device, an indication of the one or more sets of transmission parameters, the indication associated with how a characteristic of one or more ports of the UE varies across time. The operations of 1710 may be performed according to the methods described herein. In some examples, aspects of the operations of 1710 may be performed by a parameter indicator as described with reference to FIGS. 6 through 9.

At 1715, the UE may transmit the indication of the one or more sets of transmission parameters per port of the UE. The operations of 1715 may be performed according to the methods described herein. In some examples, aspects of the operations of 1715 may be performed by a parameter indicator as described with reference to FIGS. 6 through 9.

At 1720, the UE may communicate with the receiving device based on the one or more sets of transmission parameters. The operations of 1720 may be performed according to the methods described herein. In some examples, aspects of the operations of 1720 may be performed by a parameter communication component as described with reference to FIGS. 6 through 9.

FIG. 18 shows a flowchart illustrating a method 1800 that supports reference signal phase time drift model reporting for reference signal time-domain coherency in NR in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may determine one or more sets of transmission parameters associated with a reference signal type, the one or more sets of transmission parameters for enabling a receiving device to bundle reference signals of the reference signal type. The operations of 1805 may be performed according to the methods described herein. In some examples, aspects of the operations of 1805 may be performed by a parameter determination component as described with reference to FIGS. 6 through 9.

At 1810, the UE may determine each set of transmission parameters of the one or more sets of transmission parameters based on a transmission characteristic for which each set of transmission parameter applies. The operations of 1810 may be performed according to the methods described herein. In some examples, aspects of the operations of 1810 may be performed by a transmission characteristic component as described with reference to FIGS. 6 through 9.

At 1815, the UE may transmit, to the receiving device, an indication of the one or more sets of transmission parameters, the indication associated with how a characteristic of one or more ports of the UE varies across time. The operations of 1815 may be performed according to the methods described herein. In some examples, aspects of the operations of 1815 may be performed by a parameter indicator as described with reference to FIGS. 6 through 9.

At 1820, the UE may communicate with the receiving device based on the one or more sets of transmission parameters. The operations of 1820 may be performed according to the methods described herein. In some examples, aspects of the operations of 1820 may be performed by a parameter communication component as described with reference to FIGS. 6 through 9.

FIG. 19 shows a flowchart illustrating a method 1900 that supports reference signal phase time drift model reporting for reference signal time-domain coherency in NR in accordance with aspects of the present disclosure. The operations of method 1900 may be implemented by a UE 115 or base station 105 or its components as described herein. For example, the operations of method 1900 may be performed by a communications manager as described with reference to FIGS. 10 through 14. In some examples, a UE or base station may execute a set of instructions to control the functional elements of the UE or base station to perform the functions described below. Additionally or alternatively, a UE or base station may perform aspects of the functions described below using special-purpose hardware.

At 1905, the UE or base station may receive, from a UE, an indication of one or more sets of transmission parameters for a reference signal type, the indication associated with how a characteristic of one or more ports of the UE varies across time. The operations of 1905 may be performed according to the methods described herein. In some examples, aspects of the operations of 1905 may be performed by a parameter reception component as described with reference to FIGS. 10 through 14.

At 1910, the UE or base station may bundle reference signals of the reference signal type that are transmitted by the UE based on the indication of the one or more sets of transmission parameters. The operations of 1910 may be performed according to the methods described herein. In some examples, aspects of the operations of 1910 may be performed by a bundling component as described with reference to FIGS. 10 through 14.

At 1915, the UE or base station may communicate with the UE based on the one or more sets of transmission parameters and bundling the reference signals of the reference signal type. The operations of 1915 may be performed according to the methods described herein. In some examples, aspects of the operations of 1915 may be performed by a bundling communication component as described with reference to FIGS. 10 through 14.

FIG. 20 shows a flowchart illustrating a method 2000 that supports reference signal phase time drift model reporting for reference signal time-domain coherency in NR in accordance with aspects of the present disclosure. The operations of method 2000 may be implemented by a UE 115 or base station 105 or its components as described herein. For example, the operations of method 2000 may be performed by a communications manager as described with reference to FIGS. 10 through 14. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may receive, from a UE, an indication of one or more sets of transmission parameters for a reference signal type, the indication associated with how a characteristic of one or more ports of the UE varies across time. The operations of 2005 may be performed according to the methods described herein. In some examples, aspects of the operations of 2005 may be performed by a parameter reception component as described with reference to FIGS. 10 through 14.

At 2010, the UE or base station may bundle reference signals of the reference signal type that are transmitted by the UE based on the indication of the one or more sets of transmission parameters. The operations of 2010 may be performed according to the methods described herein. In some examples, aspects of the operations of 2010 may be performed by a bundling component as described with reference to FIGS. 10 through 14.

At 2015, the UE or base station may communicate with the UE based on the one or more sets of transmission parameters and bundling the reference signals of the reference signal type. The operations of 2015 may be performed according to the methods described herein. In some examples, aspects of the operations of 2015 may be performed by a bundling communication component as described with reference to FIGS. 10 through 14.

At 2020, the UE or base station may receive, from the UE, a first reference signal of the reference signal type. The operations of 2020 may be performed according to the methods described herein. In some examples, aspects of the operations of 2020 may be performed by a bundling component as described with reference to FIGS. 10 through 14.

At 2025, the UE or base station may receive, from the UE, a second reference signal of the reference signal type, where bundling the reference signals of the reference signal type includes combining the first reference signal and the second reference signal based on the one or more sets of transmission parameters. The operations of 2025 may be performed according to the methods described herein. In some examples, aspects of the operations of 2025 may be performed by a bundling component as described with reference to FIGS. 10 through 14.

The following provides an overview of aspects of the present disclosure:

Aspect 1: A method for wireless communications at a UE, comprising: determining one or more sets of transmission parameters associated with a reference signal type, the one or more sets of transmission parameters for enabling a receiving device to bundle reference signals of the reference signal type; transmitting, to the receiving device, an indication of the one or more sets of transmission parameters, the indication associated with how a characteristic of one or more ports of the UE varies across time; and communicating with the receiving device based at least in part on the one or more sets of transmission parameters.

Aspect 2: The method of aspect 1, wherein transmitting the indication of the one or more sets of transmission parameters comprises: transmitting a time gap indication for each set of the one or more sets of transmission parameters, the time gap indication comprising a time duration where a set of transmission parameters is constant.

Aspect 3: The method of aspect 2, wherein each set of the one or more sets of transmission parameters is valid for a separate time gap.

Aspect 4: The method of any of aspects 2 through 3, wherein the time gap indication comprises a time difference for which a time phase drift value is valid.

Aspect 5: The method of any of aspects 1 through 4, wherein transmitting the indication of the one or more sets of transmission parameters comprises: transmitting the indication of the one or more sets of transmission parameters per port of the UE.

Aspect 6: The method of any of aspects 1 through 5, wherein transmitting the indication of the one or more sets of transmission parameters comprises: transmitting a variance related to an uncertainty of the one or more sets of transmission parameters.

Aspect 7: The method of any of aspects 1 through 6, wherein determining the one or more sets of transmission parameters comprises: determining each set of transmission parameters of the one or more sets of transmission parameters based at least in part on a transmission characteristic for which each set of transmission parameter applies.

Aspect 8: The method of aspect 7, wherein the transmission characteristic comprises a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a component carrier used for transmitting the reference signals, a bandwidth part used for transmitting the reference signals, the reference signal type, or any combination thereof.

Aspect 9: The method of any of aspects 1 through 8, further comprising: transmitting a baseline set of transmission parameters, wherein each of the one or more sets of transmission parameters comprises a differential set of values for a corresponding set of transmission parameters based at least in part on the baseline set of transmission parameters, and wherein communicating with the receiving device is based at least in part on transmitting the baseline set of transmission parameters.

Aspect 10: The method of any of aspects 1 through 9, wherein transmitting the indication of the one or more sets of transmission parameters comprises: transmitting the indication of the one or more sets of transmission parameters via radio resource control signaling, a UE capability message, a medium access control (MAC) control element, or any combination thereof.

Aspect 11: The method of any of aspects 1 through 10, wherein transmitting the indication of the one or more sets of transmission parameters is based at least in part on the one or more sets of transmission parameters being valid between transmission of two reference signals of the reference signal type, the one or more sets of transmission parameters being valid based at least in part on a number of ports used for transmitting the two reference signals not changing, a discontinuous reception active time remaining active for the UE, whether a measurement gap occurs between transmission of the two reference signals, maintaining an active bandwidth part, maintaining a dual connectivity configuration, maintaining a carrier aggregation configuration, a transmission power of the two reference signals satisfying a power threshold value, or any combination thereof.

Aspect 12: The method of any of aspects 1 through 11, wherein a set of the one or more sets of transmission parameters comprises a time phase drift rate, one or more time difference threshold values, an amplitude difference threshold value, a phase difference threshold value, or any combination thereof.

Aspect 13: The method of any of aspects 1 through 12, wherein a set of the one or more sets of transmission parameters comprises a time-domain model for enabling the bundling of the reference signals at the receiving device.

Aspect 14: The method of any of aspects 1 through 13, wherein the reference signal type comprises a sounding reference signal, a demodulation reference signal, an uplink reference signal, a sidelink reference signal, or any combination thereof.

Aspect 15: The method of any of aspects 1 through 14, wherein the characteristic of how the one or more ports of the UE varies across time comprises a phase of the one or more ports, an amplitude of the one or more ports, or both.

Aspect 16: The method of any of aspects 1 through 15, wherein the receiving device comprises a base station, a second UE, an additional wireless device, or any combination thereof.

Aspect 17: A method for wireless communications at a receiving device, comprising: receiving, from a UE, an indication of one or more sets of transmission parameters for a reference signal type, the indication associated with how a characteristic of one or more ports of the UE varies across time; bundling reference signals of the reference signal type that are transmitted by the UE based at least in part on the indication of the one or more sets of transmission parameters; and communicating with the UE based at least in part on the one or more sets of transmission parameters and bundling the reference signals of the reference signal type.

Aspect 18: The method of aspect 17, further comprising: receiving, from the UE, a first reference signal of the reference signal type; and receiving, from the UE, a second reference signal of the reference signal type, wherein bundling the reference signals of the reference signal type comprises: combining the first reference signal and the second reference signal based at least in part on the one or more sets of transmission parameters.

Aspect 19: The method of any of aspects 17 through 18, wherein receiving the indication of the one or more sets of transmission parameters comprises: receiving a time gap indication for each set of the one or more sets of transmission parameters, the time gap indication comprising a time duration where a set of transmission parameters is constant.

Aspect 20: The method of aspect 19, further comprising: receiving, from the UE, a first reference signal of the reference signal type at a first time; receiving, from the UE, a second reference signal of the reference signal type at a second time; and determining that a difference between the second time and the first time is greater than the time duration indicated by the time gap indication, wherein the first reference signal and the second reference signal are not bundled based at least in part on the difference between the second time and the first time being greater than the time duration and the set of transmission parameters not being constant for the difference between the second time and the first time.

Aspect 21: The method of any of aspects 19 through 20, wherein each set of the one or more sets of transmission parameters is valid for a separate time gap.

Aspect 22: The method of any of aspects 19 through 21, wherein the time gap indication comprises a time difference for which a time phase drift value is valid.

Aspect 23: The method of any of aspects 17 through 22, wherein receiving the indication of the one or more sets of transmission parameters comprises: receiving the indication of the one or more sets of transmission parameters per port of the UE.

Aspect 24: The method of any of aspects 17 through 23, wherein receiving the indication of the one or more sets of transmission parameters comprises: receiving a variance related to an uncertainty of the one or more sets of transmission parameters.

Aspect 25: The method of any of aspects 17 through 24, further comprising: determining each set of transmission parameters of the one or more sets of transmission parameters is applicable for a separate transmission characteristic.

Aspect 26: The method of aspect 25, wherein the transmission characteristic comprises a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a component carrier used for transmitting the reference signals, a bandwidth part used for transmitting the reference signals, the reference signal type, or any combination thereof.

Aspect 27: The method of any of aspects 17 through 26, further comprising: receiving a baseline set of transmission parameters, wherein each of the one or more sets of transmission parameters comprises a differential set of values for a corresponding set of transmission parameters based at least in part on the baseline set of transmission parameters, and wherein communicating with the UE is based at least in part on receiving the baseline set of transmission parameters.

Aspect 28: The method of any of aspects 17 through 27, wherein receiving the indication of the one or more sets of transmission parameters comprises: receiving the indication of the one or more sets of transmission parameters via radio resource control signaling, a UE capability message, a medium access control (MAC) control element, or any combination thereof.

Aspect 29: The method of any of aspects 17 through 28, wherein receiving the indication of the one or more sets of transmission parameters is based at least in part on the one or more sets of transmission parameters being valid between transmission of two reference signals of the reference signal type, the one or more sets of transmission parameters being valid based at least in part on a number of ports used for transmitting the two reference signals not changing, a discontinuous reception active time remaining active for the UE, whether a measurement gap occurs between transmission of the two reference signals, maintaining an active bandwidth part, maintaining a dual connectivity configuration, maintaining a carrier aggregation configuration, a transmission power of the two reference signals satisfying a power threshold value, or any combination thereof.

Aspect 30: The method of any of aspects 17 through 29, wherein a set of the one or more sets of transmission parameters comprises a time phase drift rate, one or more time difference threshold values, an amplitude difference threshold value, a phase difference threshold value, or any combination thereof.

Aspect 31: The method of any of aspects 17 through 30, wherein a set of the one or more sets of transmission parameters comprises a time-domain model for enabling the bundling of the reference signals at the receiving device.

Aspect 32: The method of any of aspects 17 through 31, wherein the reference signal type comprises a sounding reference signal, a demodulation reference signal, an uplink reference signal, a sidelink reference signal, or any combination thereof.

Aspect 33: The method of any of aspects 17 through 32, wherein the characteristic of how the one or more ports of the UE varies across time comprises a phase of the one or more ports, an amplitude of the one or more ports, or both.

Aspect 34: The method of any of aspects 17 through 33, wherein the receiving device comprises a base station, a second UE, an additional wireless device, or any combination thereof.

Aspect 35: An apparatus for wireless communications at a UE, comprising a processor; memory coupled with the processor; and instructions stored in the memory and executable by the processor to cause the apparatus to perform a method of any of aspects 1 through 16.

Aspect 36: An apparatus for wireless communications at a UE, comprising at least one means for performing a method of any of aspects 1 through 16.

Aspect 37: A non-transitory computer-readable medium storing code for wireless communications at a UE, the code comprising instructions executable by a processor to perform a method of any of aspects 1 through 16.

Aspect 38: An apparatus for wireless communications at a receiving device, comprising a processor; memory coupled with the processor; and instructions stored in the memory and executable by the processor to cause the apparatus to perform a method of any of aspects 17 through 34.

Aspect 39: An apparatus for wireless communications at a receiving device, comprising at least one means for performing a method of any of aspects 17 through 34.

Aspect 40: A non-transitory computer-readable medium storing code for wireless communications at a receiving device, the code comprising instructions executable by a processor to perform a method of any of aspects 17 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

determining one or more sets of transmission parameters associated with a reference signal type, the one or more sets of transmission parameters for enabling a receiving device to bundle reference signals of the reference signal type;

transmitting, to the receiving device, an indication of the one or more sets of transmission parameters, the indication associated with how a characteristic of one or more ports of the UE varies across time, wherein the characteristic comprises a phase of the one or more ports, an amplitude of the one or more ports, or both; and communicating with the receiving device based at least in part on the one or more sets of transmission parameters.

2. The method of claim 1, wherein transmitting the indication of the one or more sets of transmission parameters comprises:

transmitting a time gap indication for each set of the one or more sets of transmission parameters, the time gap indication comprising a time duration where a set of transmission parameters is constant.

3. The method of claim 2, wherein each set of the one or more sets of transmission parameters is valid for a separate time gap.

4. The method of claim 2, wherein the time gap indication comprises a time difference for which a time phase drift value is valid.

5. The method of claim 1, wherein transmitting the indication of the one or more sets of transmission parameters comprises:

transmitting the indication of the one or more sets of transmission parameters per port of the UE.

6. The method of claim 1, wherein transmitting the indication of the one or more sets of transmission parameters comprises:

transmitting a variance related to an uncertainty of the one or more sets of transmission parameters.

7. The method of claim 1, wherein determining the one or more sets of transmission parameters comprises:

determining each set of transmission parameters of the one or more sets of transmission parameters based at least in part on a transmission characteristic for which each set of transmission parameter applies.

8. The method of claim 7, wherein the transmission characteristic comprises a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a component carrier used for transmitting the reference signals, a bandwidth part used for transmitting the reference signals, the reference signal type, or any combination thereof.

9. The method of claim 1, further comprising:

transmitting a baseline set of transmission parameters, wherein each of the one or more sets of transmission parameters comprises a differential set of values for a corresponding set of transmission parameters based at least in part on the baseline set of transmission parameters, and wherein communicating with the receiving device is based at least in part on transmitting the baseline set of transmission parameters.

10. The method of claim 1, wherein transmitting the indication of the one or more sets of transmission parameters comprises:

transmitting the indication of the one or more sets of transmission parameters via radio resource control signaling, a UE capability message, a medium access control (MAC) control element, or any combination thereof.

11. The method of claim 1, wherein:

transmitting the indication of the one or more sets of transmission parameters is based at least in part on the one or more sets of transmission parameters being valid between transmission of two reference signals of the reference signal type, the one or more sets of transmission parameters being valid based at least in part on a number of ports used for transmitting the two reference signals not changing, a discontinuous reception active time remaining active for the UE, whether a measurement gap occurs between transmission of the two reference signals, maintaining an active bandwidth part, maintaining a dual connectivity configuration, maintaining a carrier aggregation configuration, a transmission power of the two reference signals satisfying a power threshold value, or any combination thereof.

12. The method of claim 1, wherein a set of the one or more sets of transmission parameters comprises a time phase drift rate, one or more time difference threshold values, an amplitude difference threshold value, a phase difference threshold value, or any combination thereof.

13. The method of claim 1, wherein a set of the one or more sets of transmission parameters comprises a time-domain model for enabling the bundling of the reference signals at the receiving device.

14. The method of claim 1, wherein the reference signal type comprises a sounding reference signal, a demodulation reference signal, an uplink reference signal, a sidelink reference signal, or any combination thereof.

15. The method of claim 1, wherein the receiving device comprises a base station, a second UE, an additional wireless device, or any combination thereof.

16. The method of claim 1, wherein the reference signal type comprises a demodulation reference signal (DMRS).

17. A method for wireless communications at a receiving device, comprising:

receiving, from a user equipment (UE), an indication of one or more sets of transmission parameters for a reference signal type, the indication associated with how a characteristic of one or more ports of the UE varies across time, wherein the characteristic comprises a phase of the one or more ports, an amplitude of the one or more ports, or both;

bundling reference signals of the reference signal type that are transmitted by the UE based at least in part on the indication of the one or more sets of transmission parameters; and communicating with the UE based at least in part on the one or more sets of transmission parameters and bundling the reference signals of the reference signal type.

18. The method of claim 17, further comprising:

receiving, from the UE, a first reference signal of the reference signal type; and receiving, from the UE, a second reference signal of the reference signal type, wherein bundling the reference signals of the reference signal type comprises: combining the first reference signal and the second reference signal based at least in part on the one or more sets of transmission parameters.

19. The method of claim 17, wherein receiving the indication of the one or more sets of transmission parameters comprises:

receiving a time gap indication for each set of the one or more sets of transmission parameters, the time gap indication comprising a time duration where a set of transmission parameters is constant.

20. The method of claim 19, further comprising:

receiving, from the UE, a first reference signal of the reference signal type at a first time;

receiving, from the UE, a second reference signal of the reference signal type at a second time; and determining that a difference between the second time and the first time is greater than the time duration indicated by the time gap indication, wherein the first reference signal and the second reference signal are not bundled based at least in part on the difference between the second time and the first time being greater than the time duration and the set of transmission parameters not being constant for the difference between the second time and the first time.

21. The method of claim 19, wherein each set of the one or more sets of transmission parameters is valid for a separate time gap.

22. The method of claim 19, wherein the time gap indication comprises a time difference for which a time phase drift value is valid.

23. The method of claim 17, wherein receiving the indication of the one or more sets of transmission parameters comprises:

receiving the indication of the one or more sets of transmission parameters per port of the UE.

24. The method of claim 17, wherein receiving the indication of the one or more sets of transmission parameters comprises:

receiving a variance related to an uncertainty of the one or more sets of transmission parameters.

25. The method of claim 17, further comprising:

determining each set of transmission parameters of the one or more sets of transmission parameters is applicable for a separate transmission characteristic.

26. The method of claim 25, wherein the transmission characteristic comprises a reference signal resource used to transmit the reference signals, a reference signal resource set identifier used to transmit the reference signals, a number of ports used to transmit the reference signals, a usage purpose for the reference signals, a band used for transmitting the reference signals, a band combination used for transmitting the reference signals, a component carrier used for transmitting the reference signals, a bandwidth part used for transmitting the reference signals, the reference signal type, or any combination thereof.

27. The method of claim 17, further comprising:

receiving a baseline set of transmission parameters, wherein each of the one or more sets of transmission parameters comprises a differential set of values for a corresponding set of transmission parameters based at least in part on the baseline set of transmission parameters, and wherein communicating with the UE is based at least in part on receiving the baseline set of transmission parameters.

28. The method of claim 17, wherein receiving the indication of the one or more sets of transmission parameters comprises:

receiving the indication of the one or more sets of transmission parameters via radio resource control signaling, a UE capability message, a medium access control (MAC) control element, or any combination thereof.

29. The method of claim 17, wherein the reference signal type comprises a demodulation reference signal (DMRS).

30. An apparatus for wireless communications at a user equipment (UE), comprising:

one or more memories;

one or more processors coupled with the one or more memories and configured to cause the apparatus to:

determine one or more sets of transmission parameters associated with a reference signal type, the one or more sets of transmission parameters for enabling a receiving device to bundle reference signals of the reference signal type;

transmit, to the receiving device, an indication of the one or more sets of transmission parameters, the indication associated with how a characteristic of one or more ports of the UE varies across time, wherein the characteristic comprises a phase of the one or more ports, an amplitude of the one or more ports, or both; and communicate with the receiving device based at least in part on the one or more sets of transmission parameters.

31. The apparatus of claim 30, wherein the reference signal type comprises a demodulation reference signal (DMRS).

32. An apparatus for wireless communications at a receiving device, comprising:

one or more memories;

one or more processors coupled with the one or more memories and configured to cause the apparatus to:

receive, from a user equipment (UE), an indication of one or more sets of transmission parameters for a reference signal type, the indication associated with how a characteristic of one or more ports of the UE varies across time, wherein the characteristic comprises a phase of the one or more ports, an amplitude of the one or more ports, or both;

bundle reference signals of the reference signal type that are transmitted by the UE based at least in part on the indication of the one or more sets of transmission parameters; and communicate with the UE based at least in part on the one or more sets of transmission parameters and bundling the reference signals of the reference signal type.

33. The apparatus of claim 32, wherein the reference signal type comprises a demodulation reference signal (DMRS).

* * * * *